US010861663B2

(12) United States Patent
Saito

(10) Patent No.: US 10,861,663 B2
(45) Date of Patent: Dec. 8, 2020

(54) RELAY DEVICE AND A METHOD TO DETECT OPEN-CIRCUIT FAILURES

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Takahiro Saito, Mie (JP)

(73) Assignees: AutoNetworks Technologies, Ltd., Mie (JP); Sumitomo Wiring Systems, Ltd., Mie (CN); Sumitomo Electric Industries, Ltd., Osaka (JP)

( * ) Notice: Subject to any disclaimer, the term of this patent is extended or adjusted under 35 U.S.C. 154(b) by 61 days.

(21) Appl. No.: 16/063,051

(22) PCT Filed: Jun. 16, 2017

(86) PCT No.: PCT/JP2017/022239
§ 371 (c)(1),
(2) Date: Jun. 15, 2018

(87) PCT Pub. No.: WO2018/008360
PCT Pub. Date: Jan. 11, 2018

(65) Prior Publication Data
US 2019/0115175 A1 Apr. 18, 2019

(30) Foreign Application Priority Data
Jul. 7, 2016 (JP) ................. 2016-134712

(51) Int. Cl.
*H01H 47/00* (2006.01)
*H02H 1/00* (2006.01)
(Continued)

(52) U.S. Cl.
CPC ......... *H01H 47/002* (2013.01); *B60R 16/033* (2013.01); *H02H 1/0007* (2013.01);
(Continued)

(58) Field of Classification Search
CPC ...... H01H 47/002; H02H 3/16; H02H 1/0007; B60R 16/033; B60R 16/03; H02J 7/1423;
(Continued)

(56) References Cited

U.S. PATENT DOCUMENTS 8,598,734 B2 * 12/2013 Kusumi ................. B60L 50/16
307/10.1
9,802,562 B2 * 10/2017 Yasunori ............... B60R 16/033
(Continued)

FOREIGN PATENT DOCUMENTS

JP 2008-278564 A 11/2008
JP 2009-259762 A 11/2009
(Continued)

OTHER PUBLICATIONS

Search Report for PCT/JP2017/022239, dated Sep. 12, 2017.

*Primary Examiner* — Thienvu V Tran
*Assistant Examiner* — Shahzeb K Ahmad
(74) *Attorney, Agent, or Firm* — Honigman LLP

(57) ABSTRACT

A relay device wherein power can be supplied to a load from at least two power storage units and can detect when an abnormality such as an open-circuit failure occurs in a path of one of the power storage units, accurately. A control unit in a relay device functions as a switching control unit, if the current value becomes lower than a current threshold value in a first conduction path and a second conduction path, the control device switches a relay unit to an OFF state. Furthermore, the control unit functions as a determination unit and determines whether, if it switches one of the relay units to the OFF state, a voltage value detected by a voltage detection unit provided in the path in which the relay unit that was switched to the OFF state is lower than a predetermined voltage threshold value.

17 Claims, 13 Drawing Sheets

(51) Int. Cl.
*H02J 7/14* (2006.01)
*B60R 16/033* (2006.01)
*H02H 3/16* (2006.01)
*H02J 9/06* (2006.01)
*B60R 16/03* (2006.01)

(52) U.S. Cl.
CPC .............. *H02H 3/16* (2013.01); *H02J 7/1423* (2013.01); *H02J 9/061* (2013.01); *B60R 16/03* (2013.01)

(58) Field of Classification Search
CPC ........ H02J 9/061; H02J 2310/46; H02M 1/32; H02M 1/36
See application file for complete search history.

(56) References Cited

U.S. PATENT DOCUMENTS

| | | | |
|---|---|---|---|
| 2005/0035656 A1* | 2/2005 | Kuramochi | H02J 1/08 307/10.1 |
| 2012/0248869 A1* | 10/2012 | Itagaki | H02J 7/1423 307/9.1 |
| 2013/0320986 A1* | 12/2013 | Shiraishi | G01R 31/327 324/415 |
| 2015/0192630 A1* | 7/2015 | Tsukamoto | H02S 50/10 324/426 |
| 2016/0247650 A1* | 8/2016 | Tanaka | H01H 47/325 |

FOREIGN PATENT DOCUMENTS

| | | | |
|---|---|---|---|
| JP | 2015-204699 A | 11/2015 | |
| JP | 2016-530492 A | 9/2016 | |

\* cited by examiner

RELAY DEVICE AND A METHOD TO DETECT OPEN-CIRCUIT FAILURES

CROSS-REFERENCE TO RELATED APPLICATIONS

This application is the U.S. national stage of PCT/JP2017/022239 filed Jun. 16, 2017, which claims priority of Japanese Patent Application No. 2016-134712 filed on Jul. 7, 2016, which is incorporated herein by reference in its entirety.

FIELD OF THE INVENTION

Technical Field

The present description relates to an in-vehicle relay device.

Background of the Invention

JP 2014-34376A discloses a vehicle power supply system in which two storage batteries are connected via a connection switch. In this vehicle power supply system, while regenerative power generation is performed, a regulated voltage of an alternator is controlled to be higher than its output voltage generated while the regenerative power generation is not performed. In addition, while regenerative power generation is performed, a target voltage of a lead storage battery is set, and then control is performed so that a deviation between a detected value of a voltage and the target voltage of the lead storage battery is lower than or equal to a predetermined amount and the regulated voltage of the alternator is not higher than the target voltage by a predetermined voltage width or more.

SUMMARY OF THE INVENTION

The vehicle power supply system disclosed in JP 2014-34376A employs the above-described control, thus suppressing instability of electric load operation caused when the connection switch, which is provided between the first storage battery and the second storage battery, is cut off. However, this system does not have a function for accurately detecting open-circuit failures the like that occurs between the storage batteries and a load and a function for protecting the load when an open-circuit failure or the like occurs, and thus there is the problem that, when this kind of abnormality occurs, effective measures cannot be made.

The present description has been made in view of the above-described situation and aims to realize a relay device that can be applied to a system in which power can be supplied to a load from at least two power storage units and can detect, when an open-circuit failure occurs in one of the paths of the storage units, the abnormality more accurately.

A relay device that is an example of the present description includes:

a first relay unit provided in a first conduction path that is a path for supplying power from a first power storage unit to a load, the first relay unit being configured to be switched between ON and OFF states; a second relay unit provided in a second conduction path that is a path for supplying power from a second power storage unit to a load, the second relay unit being configured to be switched between ON and OFF states; a first current detection unit configured to detect a current value of the first conduction path; a second current detection unit configured to detect a current value of the second conduction path; a first voltage detection unit configured to detect a voltage value at a position on a first power storage unit side relative to the first relay unit in the first conduction path; a second voltage detection unit configured to detect a voltage value at a position on a second power storage unit side relative to the second relay unit in the second conduction path; a switching control unit configured to maintain the ON state of the first relay unit and the second relay unit if both current values of the first conduction path and the second conduction path are larger than or equal to a predetermined current threshold value, and configured to switch, if the current value becomes lower than the predetermined current threshold value in one of the first conduction path and the second conduction path, that one of the first relay unit and the second relay unit that is provided in the path in which the current value becomes lower than the predetermined current threshold value, to the OFF state; and a determination unit configured to determine whether, if the switching control unit switched the one relay unit to the OFF state, a voltage value that is detected by that one of the first voltage detection unit and the second voltage detection unit that is provided in the path in which the one relay unit is provided, is lower than a predetermined voltage threshold value.

In the above-described relay device, if both current values of the first conduction path and the second conduction path is larger than or equal to the predetermined current threshold value, the switching control unit keeps the ON state of the first relay unit and the second relay unit. With this configuration, if a current that is larger than or equal to the threshold value is supplied in each of the first conduction path and the second conduction path, it is possible to supply the current through two paths. Accordingly, if an open-circuit failure occurs in one of the first conduction path and the second conduction path and the current decreases or stops in the one path, current supply to the load is appropriately continued if the current is appropriately maintained in the other path.

In addition to enabling current supply through the two paths, if a current value becomes lower than the predetermined current threshold value in one of the paths, one of the first relay unit and the second relay unit, which is provided in the paths in which the current value becomes lower than the current threshold value, can be switched to the OFF state. In this manner, after the one relay unit provided in the one path in which the current decreases or stops was switched to the OFF state, it can be determined whether a voltage value on an upstream side relative to the one relay unit is lower than the predetermined voltage threshold value. By making the determination in such a manner, it is possible to distinguish more accurately whether a cause of a current value becoming lower than the threshold value in one of the paths is due to decrease of the voltage on the upstream side of the one relay unit.

Therefore, a relay device that can be applied to a system in which power can be supplied to a load from at least two power storage units and can more accurately detect, when an open-circuit failure occurs in a path on an upstream side of one of relay units, the abnormality can be realized.

DETAILED DESCRIPTION OF THE PREFERRED EMBODIMENTS

Figure 1:
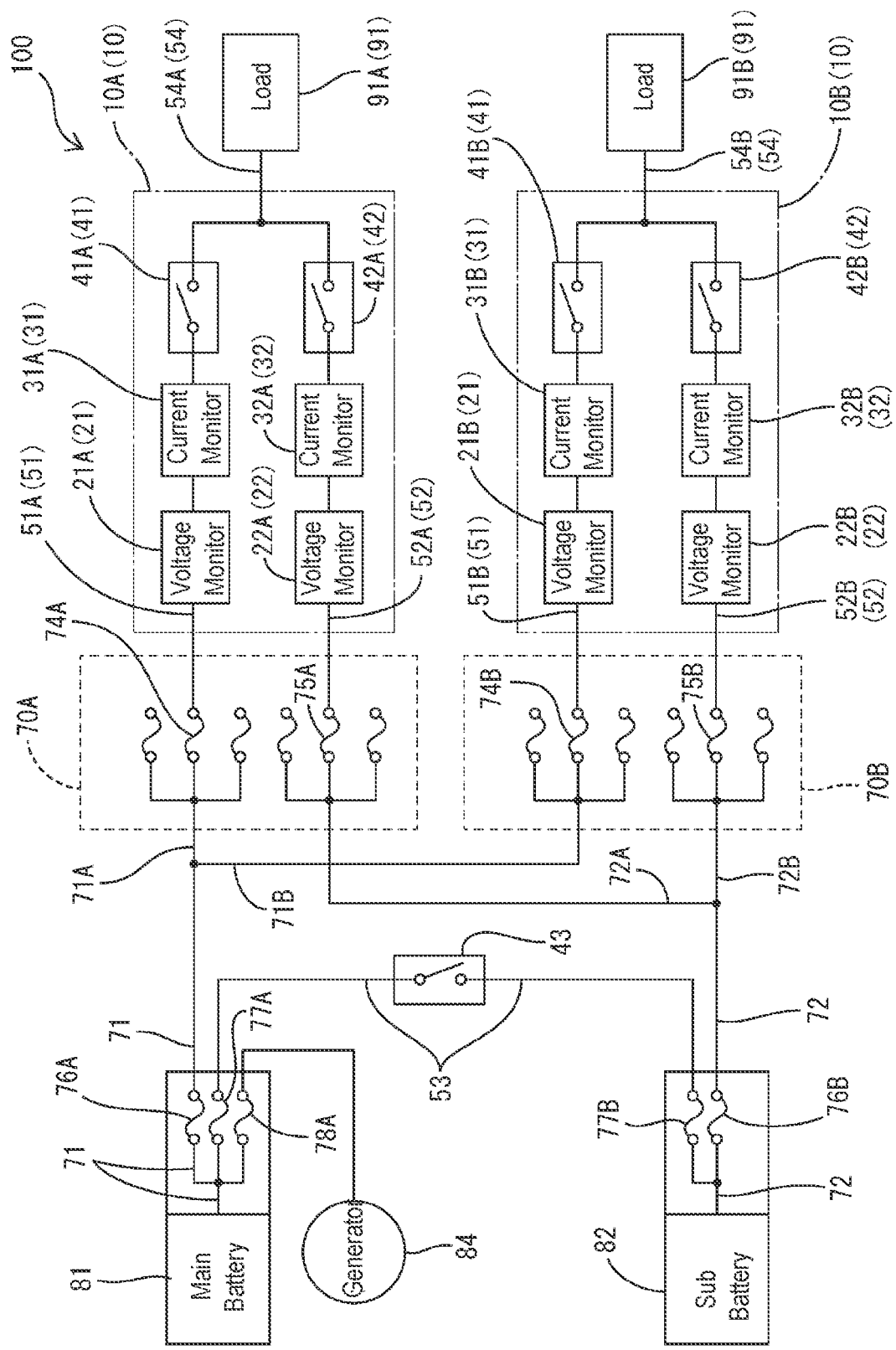
FIG. 1 is a block diagram schematically illustrating an example of an in-vehicle power supply system including a relay device according to Embodiment 1.

The following shows preferred examples of the present description. If a current value becomes lower than the predetermined current threshold value in one of the first conduction path and the second conduction path, the switching control unit may be configured to function to switch one of first relay unit and the second relay unit to the OFF state after confirming that the other relay unit is in the ON state.

If it is detected that a current value is lower than the threshold value in one of the paths, the relay device configured in this manner can switch the relay unit provided in the path (one relay unit) to the OFF state after securely switching the other relay unit to the ON state. Accordingly, power supply to the load is reliably prevented from being lost before and after the one relay unit is switched to the OFF state.

The relay device may include a notification unit configured to give a notification if the determination unit has determined that a voltage value, which is detected by the one voltage detection unit when the one relay unit is in the OFF state, is lower than the predetermined voltage threshold value.

If a possibility that an abnormality occurs in one of the paths becomes higher (if the current decreases or stops in one of the paths, when the relay unit in the one path is switched to the OFF state, and if a voltage value on the upstream side of the relay unit becomes lower than the threshold value), the relay device configured in this manner can notify the outside about this. Accordingly, it is easier for a user or a device receiving the notification to take appropriate measures according to the abnormality.

The switching control unit may be configured to function to return the one relay unit to the ON state if the determination unit has determined that a voltage value, which is detected by the one voltage detection unit when the one relay unit is in the OFF state, is not lower than the predetermined voltage threshold value.

When the current flowing through one of the paths temporarily decreases, for example, by influence of noise and the like and the one relay unit is switched to the OFF state according to this, if a voltage exceeding the predetermined voltage threshold value generates on the upstream side of the one relay unit (that is, if a possibility that an abnormality such as an open-circuit failure does not occur on the upstream side of the one relay unit is high), the relay device configured in this manner returns the one relay unit to the ON state and can continue power supply through the one path.

If a current value becomes lower than the predetermined current threshold value in both of the first conduction path and the second conduction path, the switching control unit may be configured to function to set a state, as a first switching state, in which one of the first relay unit and the second relay unit is switched to the OFF state and the other relay unit is switched to the ON state, and after setting the first switching state, the switching control unit may be configured to function to set a state, as a second switching state, in which the other relay unit is switched to the OFF state and the one relay unit is switched to the ON state. The determination unit may be configured to function to determine whether, when in the first switching state, a voltage value detected by one of the first voltage detection unit and the second voltage detection unit, which is provided in the path in which the one relay unit is provided, is lower than the predetermined voltage threshold value, and may be configured to function to determine whether, when in the second switching state, a voltage value detected by the other voltage detection unit of the first voltage detection unit and the second voltage detection unit, which is provided in a path in which the other relay unit is provided, is lower than the predetermined voltage threshold value.

The relay device configured in this manner determines, if a current value becomes lower than the predetermined current threshold value in both of the first conduction path and the second conduction path, a voltage value on the upstream side by switching the relay units to the OFF state one by one, and it can separately determine whether voltage drop due to an open-circuit failure or the like occurs on the upstream side of each relay unit. In addition, when performing the determination with one of the relay units being in the OFF state, because power to the load supply can be continued by the other relay unit being in the ON state, and thus the power supply to the load is not easily interrupted.

The switching control unit may be configured to control a third relay unit to be in the ON or OFF state, the third relay unit may being configured to switch, between conductive and non-conductive states, a third conduction path whose one end is connected to a conduction path between the first power storage unit and the first relay unit and whose other end is connected to a conduction path between the second power storage unit and the second relay unit. Then, the switching control unit may be configured to switch, if reverse flow of current occurs in one of the first conduction path and the second conduction path, that relay unit of the first relay unit and the second relay unit that is provided in a reverse flow path in which the reverse flow of current occurs, to the OFF state and configured to set the third relay unit to the OFF state.

The relay device configured in this manner can be effectively applied to a system that has a supply source of a charging current on one power storage unit side and can supply the charging current from this supply source to the other power storage unit via the third conduction path. In this configuration, if reverse flow of current occurs in one of the first conduction path and the second conduction path, the reverse flow can be cut off by switching the relay unit of the first relay unit and the second relay unit that is provided in the reverse flow path in which reverse flow of current occurs, to the OFF state. Furthermore, because the third relay unit can be switched to the OFF state when reverse flow occurs, if the reverse current occurs due to a short-circuit and the like occurring in the vicinity of the power storage unit, the other path can be electrically separated from the short-circuit portion. Accordingly, also if reverse flow occurs due to a short-circuit in the vicinity of the power storage unit, current supply to the load via the other path is likely to be stably continued.

The relay device may include a third power storage unit that is electrically connected to at least one of a portion on a load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

The relay device configured in this manner can supply power to the load using the third power storage unit even if both of the relay units enter the OFF state for some reason, and thus power supply to the load is less likely to be cut off. When a path of one relay unit is inspected, for example, by switching the one relay unit to the OFF state, even if the other relay unit is in the OFF state for some reason, power supply to the load is likely to be continued with power supplied from the third power storage unit.

Embodiment 1

The following will describe Embodiment 1 in which the present description is embodied. An in-vehicle power supply system 100 (hereinafter, also referred to as "system 100") is configured as a power supply system for a vehicle that includes a plurality of batteries (a first power storage unit 81 and a second power storage unit 82). A relay device 10 constitutes a portion of the in-vehicle power supply system 100. Note that the in-vehicle power supply system 100 in FIG. 1 includes two relay devices 10 (a first relay device 10A and a second relay device 10B) that have the same function.

The first power storage unit 81 functions as a main power supply, and consists of, for example, a well-known battery such as a lead battery. In the following description and the drawings, the first power storage unit 81 is also referred to as "main battery". A terminal on a high-potential side of the first power storage unit 81 is electrically connected to a wiring portion 71 provided outside of the relay device 10, and the first power storage unit 81 has a configuration in which it applies DC voltage to the wiring portion 71. A terminal on a low-potential side of the first power storage unit 81 is, for example, electrically connected to ground.

The generator 84 is electrically connected to the wiring portion 71 that is conductively connected with the first power storage unit 81, and has a configuration in which it applies generated voltage to the wiring portion 71. The generator 84 is configured as a well-known alternator, and its operation is controlled by an electronic control device (not shown). This generator 84 has a function to charge the first power storage unit 81, and has a function to charge the second power storage unit 82 as well when a third relay unit 43 (separation relay) is switched ON.

The second power storage unit 82 functions as an auxiliary power supply and consists of, for example, a well-known power supply such as a lithium ion battery or an electric double-layer capacitor. In the following description and the drawings, the second power storage unit 82 is also referred to as "sub battery". The second power storage unit 82 can receive more energy than the first power storage unit 81. Its terminal on a high-potential side is electrically connected to a wiring portion 72 provided outside of the relay device 10, and has a configuration in which it applies DC voltage to the wiring portion 72. A low-potential side terminal of the second power storage unit 82 is, for example, electrically connected to ground. Note that this system has a configuration in which regenerative energy generated by the generator 84 is supplied not only to the first power storage unit 81 but also to the second power storage unit 82 in order to charge them.

A third conduction path 53 is a conduction path that can provide a conductive connection between the wiring portion 71 that is electrically connected to the first power storage unit 81 and the wiring portion 72 that is electrically connected to the second power storage unit 82. One side of the third conduction path 53 is electrically connected to the wiring portion 71 and the terminal on the high-potential side of the first power storage unit 81 (main battery) via a fuse 77A, and the other side is electrically connected to the wiring portion 72 and the terminal on the high-potential side of the second power storage unit 82 (sub battery) via a fuse 77B.

The third relay unit 43 (separation relay) is a relay unit that switches the third conduction path 53 between the conductive and non-conductive states. When the third relay unit 43 is in the ON state, the third conduction path 53 is in the conductive state, and the path between the wiring portion 71 and the wiring portion 72 is in the conductively connected state. When the third relay unit 43 is in the OFF state, the third conduction path 53 is in the non-conductive state, and electric conduction is cut off in both directions in the third conduction path 53.

The wiring portion 71 that is electrically connected to the first power storage unit 81 branches into two power paths 71A and 71B. The power path 71A is a path used for supplying power from the first power storage unit 81 to a load 91A, and electrically connected to a first conduction path 51A of one relay device 10A via a fuse 74A. The power path 71B is a path used for supplying power from the first power storage unit 81 to a load 91B, and electrically connected to a first conduction path 51B of the other relay device 10B via a fuse 74B.

The wiring portion 72 that is electrically connected to the second power storage unit 82 branches into two power paths 72A and 72B. The power path 72A is a path used for supplying power from the second power storage unit 82 to the load 91A, and electrically connected to a second conduction path 52A of the one relay device 10A via a fuse 75A. The power path 72B is a path used for supplying power from the second power storage unit 82 to the load 91B, and electrically connected to a second conduction path 52B of the other relay device 10B via a fuse 75B. Fuses provided in the power paths 71A and 72A (such as the fuses 74A and 75A) are housed in a first fuse box 70A, and fuses provided in the power paths 71B and 72B (such as the fuses 74B and 75B) are housed in a second fuse box 70B.

The load 91 is a well-known in-vehicle electric component and may be any of various loads. The load 91 may be an ignition-related load such as a steering actuator, a shift-by-wire mechanism, or an electronic control brake system (a load that operates when an ignition switch is in an ON state), or may be an accessory-related load such as a navigation system device, an audio device, or an air conditioner (a load that operates when an accessory switch is in an ON state). In the example of FIG. 1, the load 91A is electrically connected to the relay device 10A, and is a load whose power-supplied state is switched by the relay device 10A. The load 91B is electrically connected to the relay device 10B, and is a load whose power-supplied state is switched by the relay device 10B. It is desirable to select a load whose continuous operation is strongly desired as these loads 91A and 91B. The in-vehicle power supply system 100 shown in FIG. 1 has a configuration in which, even when power supply from one power storage unit to the loads 91A and 91B is lost, power supply from the other power storage unit to the loads can be maintained, and has a configuration in which stable operation of the load is easily continued.

Figure 2:
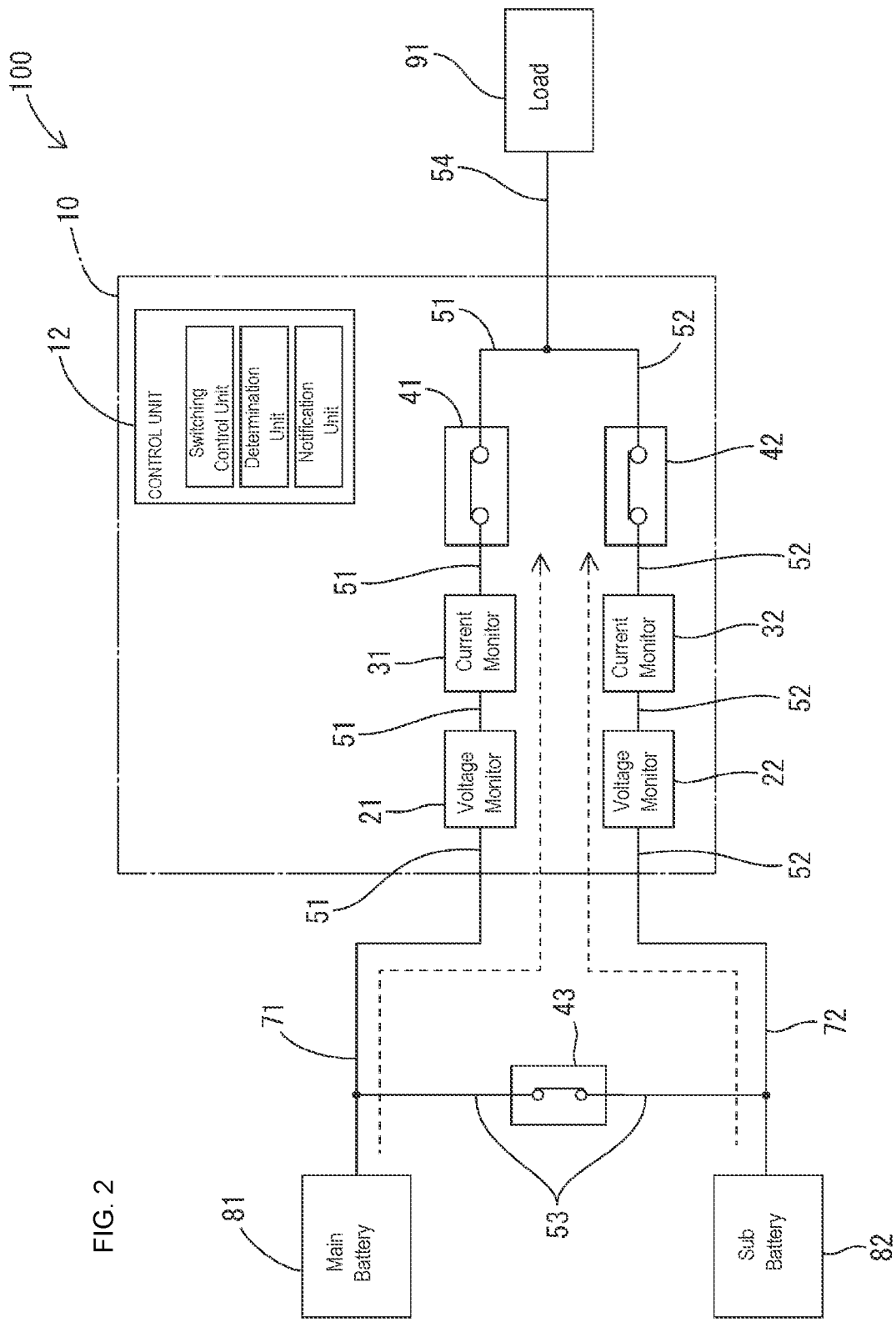
FIG. 2 is a block diagram schematically illustrating an example of the relay device and its surroundings according to Embodiment 1.

Next, the relay device 10 will be described. As shown in FIGS. 1 and 2, the relay device 10 includes a first relay unit 41, a second relay unit 42, a first voltage detection unit 21, a second voltage detection unit 22, a first current detection unit 31, a second current detection unit 32, and a control unit 12, for example. Two relay devices 10A and 10B are mounted in the in-vehicle power supply system 100 shown in FIG. 1. These relay devices have the same configuration, and each of them is configured as shown in FIG. 2. Note that, in FIG. 1, the elements of the relay device 10A are represented as a first relay unit 41A, a second relay unit 42A, a first voltage detection unit 21A, a second voltage detection unit 22A, a first current detection unit 31A, and a second current detection unit 32A. The first conduction path 51, the second conduction path 52, and a conduction path 54 that connects these conduction paths to the load are separately represented as the first conduction path 51A, the second conduction path 52A, and a conduction path 54A respectively. Also, the elements of the relay device 10B are represented as a first relay unit 41B, a second relay unit 42B, a first voltage detection unit 21B, a second voltage detection unit 22B, a first current detection unit 31B, and a second current detection unit 32B. The first conduction path 51, the second conduction path 52, and a conduction path 54 that connects these conduction paths to the load are separately represented as the first conduction path 51B, the second conduction path 52B, and a conduction path 54B respectively.

As a representative example, in the following description, it is assumed that the relay device 10A shown in FIG. 1 has a configuration as shown in FIG. 2. As shown in FIG. 2, the relay device 10 includes the first relay unit 41, the second relay unit 42, the first voltage detection unit 21, the second voltage detection unit 22, the first current detection unit current 31, the second current detection unit 32, and the control unit 12, for example. In the example shown in FIG. 2, the first relay unit 41, the second relay unit 42, the first voltage detection unit 21, the second voltage detection unit 22, the first current detection unit 31, the second current detection unit 32, and the control unit 12 are mounted on the same board, and the entire relay device 10 is configured as a unit device in which these elements are integrated into a unit. Note that, in FIG. 2, the generator 84 (shown in FIG. 1) and so on are omitted and the configuration is only schematically illustrated.

The first relay unit 41 is provided in the first conduction path 51 that is a path for supplying power from the first power storage unit 81 to the load 91, and has a configuration in which it is switched between the ON and OFF states. The first relay unit 41 is provided on a downstream side (load 91 side) of the first voltage detection unit 21 and the first current detection unit 31 in the first conduction path 51, and configured as a relay that switches the first conduction path 51 between the conductive and non-conductive states. If the first relay unit 41 is in the ON state, the path between the first power storage unit 81 and the load 91 is conductively connected via the first conduction path 51. At this time, it is possible to supply power from the first power storage unit 81 to the load 91 via the first conduction path 51. If the first relay unit 41 is in the OFF state, no current flows through the first conduction path 51 in either direction. At this time, it is impossible to supply power from the first power storage unit 81 to the load 91 via the first conduction path 51.

The second relay unit 42 is provided in the second conduction path 52 that is a path for supplying power from the second power storage unit 82 to the load 91, and has a configuration in which it is switched between the ON and OFF states. The second relay unit 42 is provided on a downstream side (load 91 side) of the second voltage detection unit 22 and the second current detection unit 32 in the second conduction path 52, and configured as a relay that switches the second conduction path 52 between the conductive and non-conductive states. If the second relay unit 42 is in the ON state, the path between the second power storage unit 82 and the load 91 is conductively connected via the second conduction path 52. At this time, it is possible to supply power from the second power storage unit 82 to the load 91 via the second conduction path 52. If the second relay unit 42 is in the OFF state, no current flows through the second conduction path 52 in either direction. At this time, it is impossible to supply power from the second power storage unit 82 to the load 91 via the second conduction path 52.

The first current detection unit 31 is configured as a well-known current detection circuit that detects a current value of the first conduction path 51. In FIG. 2, the first current detection unit 31 is also referred to as "current monitor". The first current detection unit 31 is provided with a configuration in which it can detect current flowing at a position on an upstream side (first power storage unit 81 side) relative to the first relay unit 41 in the first conduction path 51, and provides a detected value in accordance with a value of the current flowing through the first conduction path 51 to the control unit 12 via a signal line (not shown). The control unit 12 can specify, according to the detected value that is input from the first current detection unit 31, a current value of the first conduction path 51.

The second current detection unit 32 is configured as a well-known current detection circuit that detects a current value of the second conduction path 52. In FIG. 2, the second current detection unit 32 is also referred to as "current monitor". The second current detection unit 32 is provided on an upstream side (second power storage unit 82 side) relative to the second relay unit 42 in the second conduction path 52, and provides a detected value in accordance with a value of the current flowing through the second conduction path 52 to the control unit 12 via a signal line (not shown). The control unit 12 can specify, according to the detected value that is input from the second current detection unit 32, a current value of the second conduction path 52.

The first voltage detection unit 21 is configured as a well-known voltage detection circuit. In FIG. 2, the first voltage detection unit 21 is also referred to as "voltage monitor". The first voltage detection unit 21 is provided on an upstream side (first power storage unit 81 side) relative to the first relay unit 41 in the first conduction path 51, and provides a detected value in accordance with a voltage value at a predetermined position (a position on the first power storage unit 81 side relative to the first relay unit 41) in the first conduction path 51 to the control unit 12 via a signal line (not shown). The control unit 12 can specify, according to the detected value that is input from the first voltage detection unit 21, a voltage value at the predetermined position of the first conduction path 51.

The second voltage detection unit 22 is configured as a well-known voltage detection circuit. In FIG. 2, the second voltage detection unit 22 is also referred to as "voltage monitor". The second voltage detection unit 22 is provided on an upstream side (second power storage unit 82 side) relative to the second relay unit 42 in the second conduction path 52, and provides a detected value in accordance with a voltage value at a predetermined position (a position on the second power storage unit 82 side relative to the second relay unit 42) in the second conduction path 52 to the control unit 12 via a signal line (not shown). The control unit 12 can specify, according to the detected value that is input from the second voltage detection unit 22, a voltage value at the predetermined position of the second conduction path 52.

The control unit 12 is, for example, configured as a control unit that includes a CPU. The values detected by the first voltage detection unit 21, the second voltage detection unit 22, the first current detection unit 31, and the second current detection unit 32 are input to the control unit 12, and the control unit 12 controls, based on these detected values, switching of the first relay unit 41, the second relay unit 42, and the third relay unit 43.

Next, control of the relay device 10 will be described with reference to FIGS. 2, 6 and so on. The control unit 12 executes switching control shown in FIG. 6 when a predetermined start condition is established. The predetermined start condition is not particularly limited, but may be, for example, the start of power supply to the control unit 12.

Figure 6:
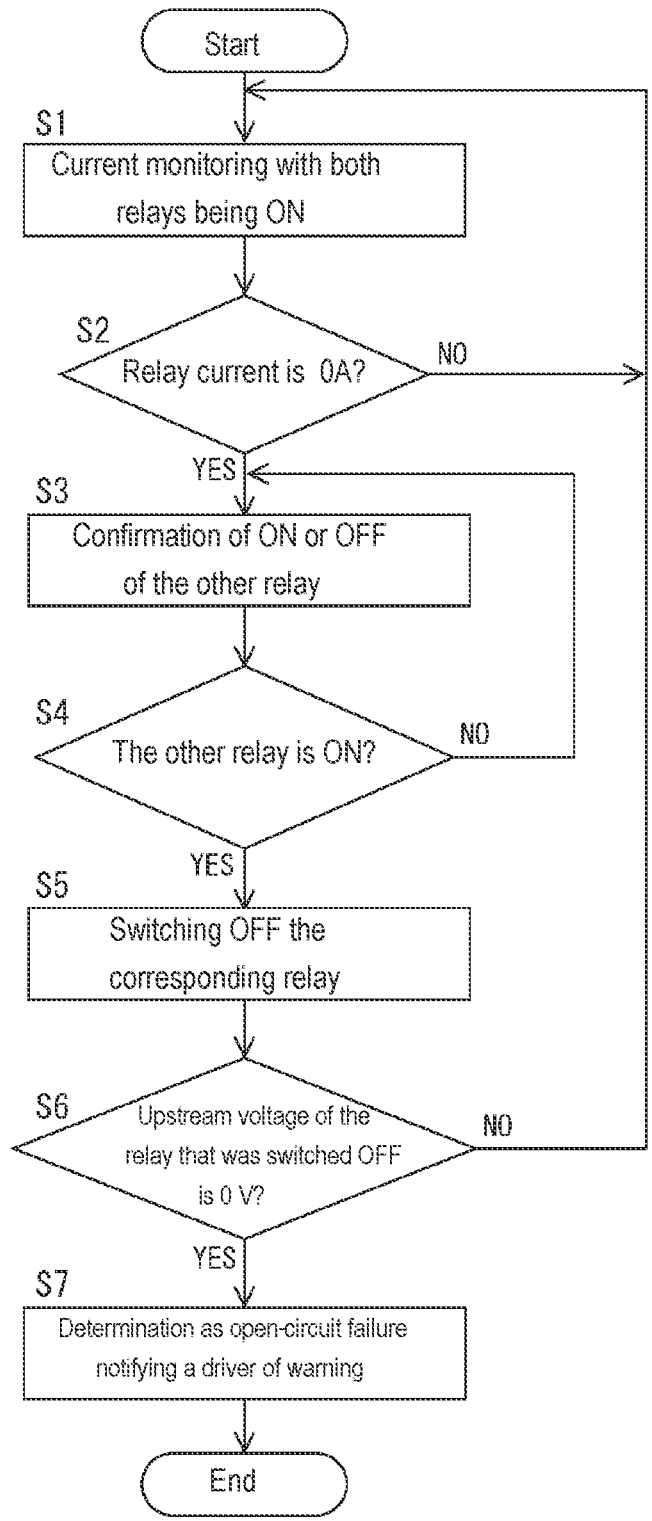
FIG. 6 is a flowchart illustrating an example of a control flow performed by the relay device according to Embodiment 1.

When starting the switching control shown in FIG. 6, the control unit 12 switches both of the first relay unit 41 and the second relay unit 42 shown in FIG. 2 to the ON state, and monitors the detected values that are input from the first current detection unit 31 and the second current detection unit 32 (S1). At this time, if the circuit is normal, power can be supplied to the load 91 from both of the first power storage unit 81 and the second power storage unit 82. Note that, in FIG. 2, a state in which currents are supplied from the first power storage unit 81 and the second power storage unit 82 via both of the conduction paths when the circuit is normal is conceptually indicated by broken lines.

In the process of step S1, the control unit 12 switches the first relay unit 41 and the second relay unit 42 to the ON state and monitors the detected values that are input from the first current detection unit 31 and the second current detection unit 32, and then executes the process of step S2, determines whether one of the current values of the first conduction path 51 and the second conduction path 52 is equivalent to 0 A when the first relay unit 41 and the second relay unit 42 are in the ON state. In this configuration, a predetermined current threshold value Ith to determine whether the current value is equivalent to 0 A is previously set, the control unit 12 determines whether, in the process of step S2, one of a current value I1 of the first conduction path 51, which is ascertained from the detected value form the first current detection unit 31, and a current value I2 of the second conduction path 52, which is ascertained from the detected value from the second current detection unit 32, is lower than the current threshold value Ith.

In the process of step S2, if the control unit 12 has determined that both of the current value I1 of the first conduction path 51 and the current value I2 of the second conduction path 52 are higher than or equal to the current threshold value Ith and currents flowing through the first conduction path 51 and the second conduction path 52 are in normal state in which the current flows in a normal direction, which is the direction toward the load 91 (in case of "NO" in S2), the control unit 12 executes the process of step S1, keeps the ON state of both of the first relay unit 41 and the second relay unit 42, and then continues monitoring the detected values that are input from the first current detection unit 31 and the second current detection unit 32. In this manner, in the switching control shown in FIG. 6, each of the first relay unit 41 and the second relay unit 42 is switched to the ON state after the control starts, and both of the first relay unit 41 and the second relay unit 42 are kept in the ON state while both of the current value I1 of the first conduction path 51 and the current value I2 of the second conduction path 52 are higher than or equal to the current threshold value Ith and each current flows in the normal direction. While the first relay unit 41 and the second relay unit 42 is kept in the ON state, the control unit 12 continues monitoring whether one of the current value I1 of the first conduction path 51 and the current value I2 of the second conduction path 52 becomes lower than the current threshold value Ith.

On the other hand, in the process of step S2, if the control unit 12 determines that one of the current value I1 of the first conduction 51 and the current value I2 of the second conduction path 52 is lower than the current threshold value Ith (in case of "YES" in S2), the control unit 12 executes the process of step S3, and confirms the ON or OFF state of the other relay unit that is different from the relay unit (the relay unit to be OFF) in the path whose current value is lower than the current threshold value Ith. Specifically, the control unit 12 confirms whether the relay unit, which is provided in the other path that is different from the path whose current value is determined to be lower than the current threshold value Ith in step S2, is in the ON or OFF state. If it is determined that, for example, the current value I1 of the first conduction path 51 is lower than the current threshold value Ith, in the following step S3, the control unit 12 confirms whether the second relay unit 42, which is provided in the other path (the second conduction path 52) that is different from the path (the first conduction path 51) whose current value is determined to be lower than the current threshold value Ith, has been controlled to be in the OFF state.

In the process of step S4 after executing the process of step S3, the control unit 12 determines whether the relay unit, which is provided in the other path that is different from the path whose current value is determined to be lower than the current threshold value Ith, is in the ON state, and then, if the relay is not in the ON state, the control unit 12 executes the process of step S3 again for reconfirming the ON or OFF state of the relay. In this manner, in the switching control in FIG. 6, if it is determined that the current value of one of the paths is lower than the current threshold value Ith, the confirmation process of step S3 and the determination process of step S4 are repeated until the relay unit provided in the other path is switched to the ON state.

Figure 3:
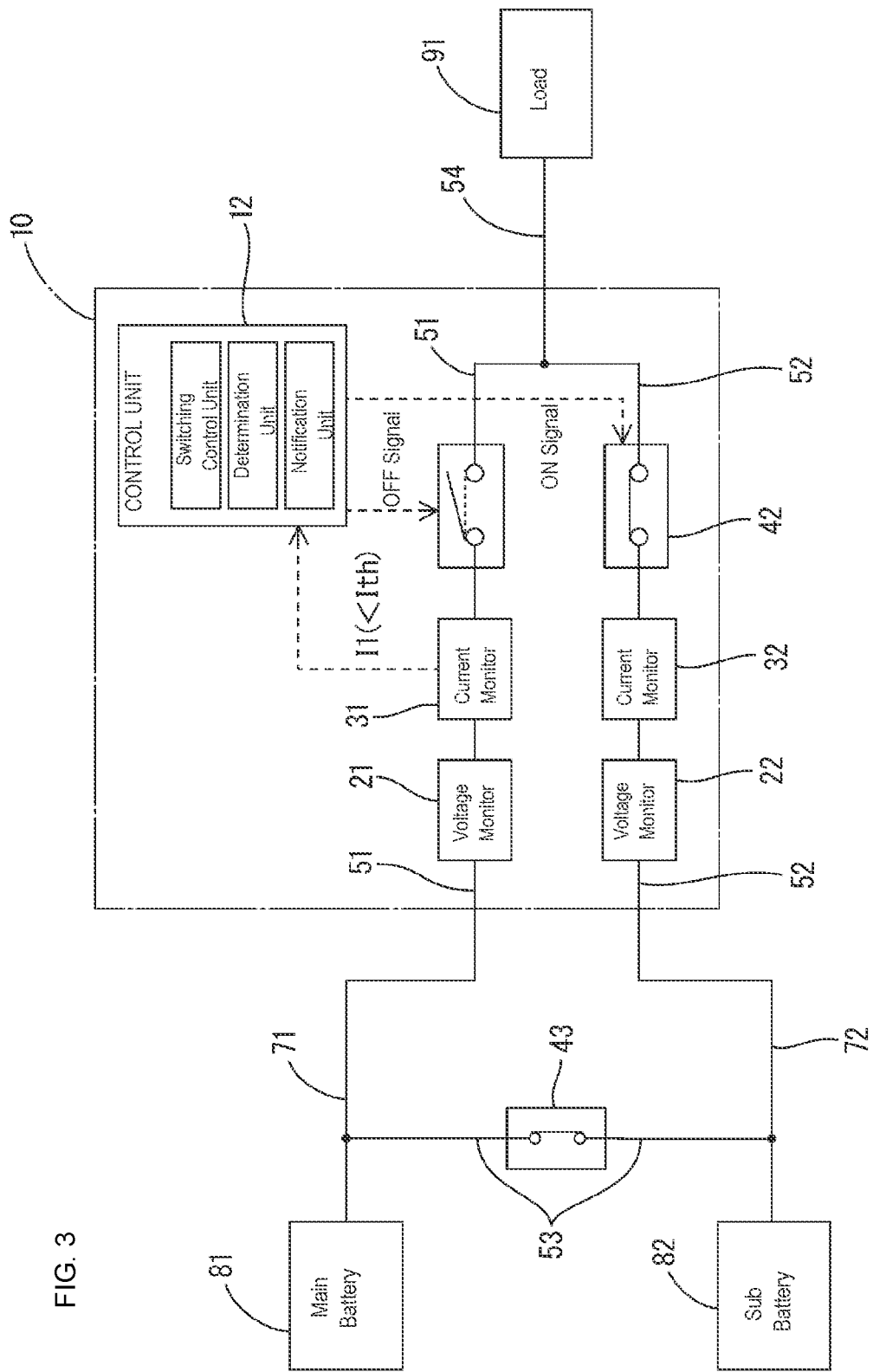
FIG. 3 is an illustrative diagram conceptionally illustrating control if a current value becomes lower than a threshold value in one of the paths in the relay device shown in FIG. 2.

When executing the determination process of step S4, if the control unit 12 determines that the relay unit, which is provided in the other path that is different from the path whose current value is determined to be lower than the current threshold value Ith, is in the ON state (in case of "YES" in S4), the control unit 12 executes the process of step S5, and then switches the relay unit provided in the path whose current value is determined to be lower than the current threshold value Ith to the OFF state. If it is determined that, for example, the current value I1 of the first conduction path 51 is lower than the current threshold value Ith, when the control unit 12 confirms that the second relay unit 42 is in the ON state in step S4, the control unit 12 provides a control signal that causes the first relay unit 41 to be switched to the OFF state as shown in FIG. 3 in the process of step S5, and switches the first relay unit 41 provided in the first conduction path 51 to the OFF state.

In this configuration, the control unit 12 is one example of the switching control unit, if both of the current values of the first conduction path 51 and the second conduction path 52 is larger than the predetermined current threshold value, the first relay unit 41 and the second relay unit 42 are kept in the ON state, whereas if the current value of one of the first conduction path 51 and the second conduction path 52 becomes lower than the predetermined current threshold value Ith, one of the first relay unit 41 and the second relay unit 42, which is provided in the path whose current value is determined to be lower than the current threshold value Ith, is switched to the OFF state. More specifically, if the current value of one the first conduction path 51 and the second conduction path 52 becomes lower than the predetermined current threshold value Ith, the control unit 12 switches one of the first relay unit 41 and the second relay unit 42 (the relay unit provided in the path whose current value has decreased) to the OFF state after confirming that the other relay unit (the relay unit provided in the path whose current value has not decreased) is in the ON state.

Figure 4:
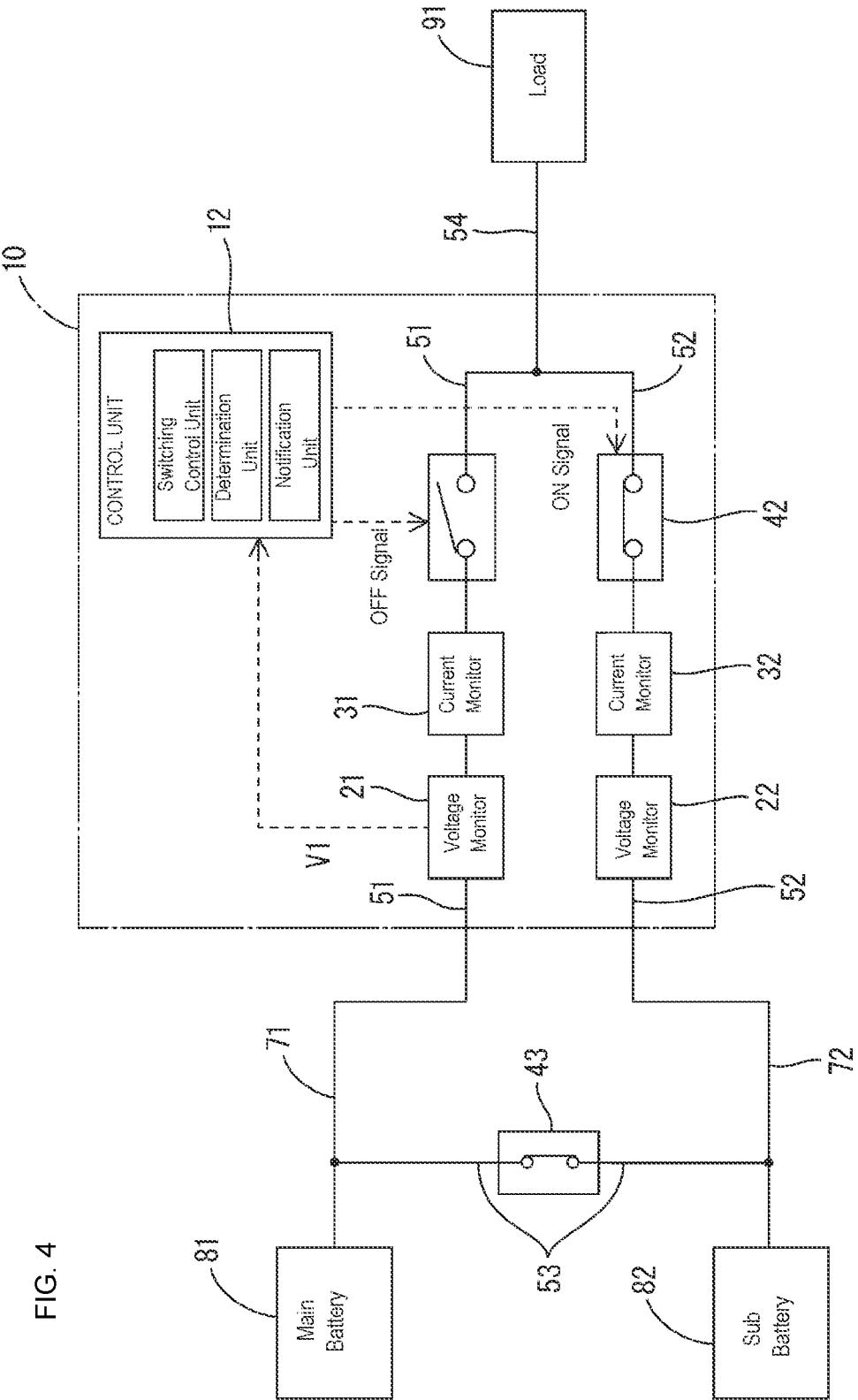
FIG. 4 is an illustrative diagram conceptionally illustrating voltage determination on an upstream side when a relay unit in one of the paths is switched to an OFF state in the relay device shown in FIG. 2.

After executing the process of step S5, the control unit 12 executes the process of step S6, and determines whether, based on the detected value from the voltage detection unit provided on the upstream side of the relay unit that was switched to the OFF state in step S5 (the relay unit provided in the path that was determined that its current value was lower than the current threshold value Ith in step S2), the voltage value on the upstream side of the relay unit that was switched to the OFF state is equivalent to 0 V. Specifically, the control unit 12 determines whether the voltage value on the upstream side of the relay unit that was switched to the OFF state in step S5 is lower than the voltage threshold value Vth. If it is determined that, for example, the current value I1 of the first conduction path 51 is lower than the current threshold value Ith and the first relay unit 41 provided in the first conduction path 51 is switched to the OFF state as shown in FIG. 3, the control unit 12 determines whether, according to the detected value from the first voltage detection unit 21, a voltage value V1 on the upstream side of the first relay unit 41 in the first conduction path 51 is lower than the voltage threshold value Vth as shown in FIG. 4.

In this manner, if one of the relay units is switched to the OFF state in response to a current decrease in one of the paths, the control unit 12, which functions as the determination unit, determines whether the voltage value detected by that one of the first voltage detection unit 21 and the second voltage detection unit 22 that detects the voltage of the path in which the one relay unit is provided, is lower than the predetermined voltage threshold value Vth.

Figure 5:
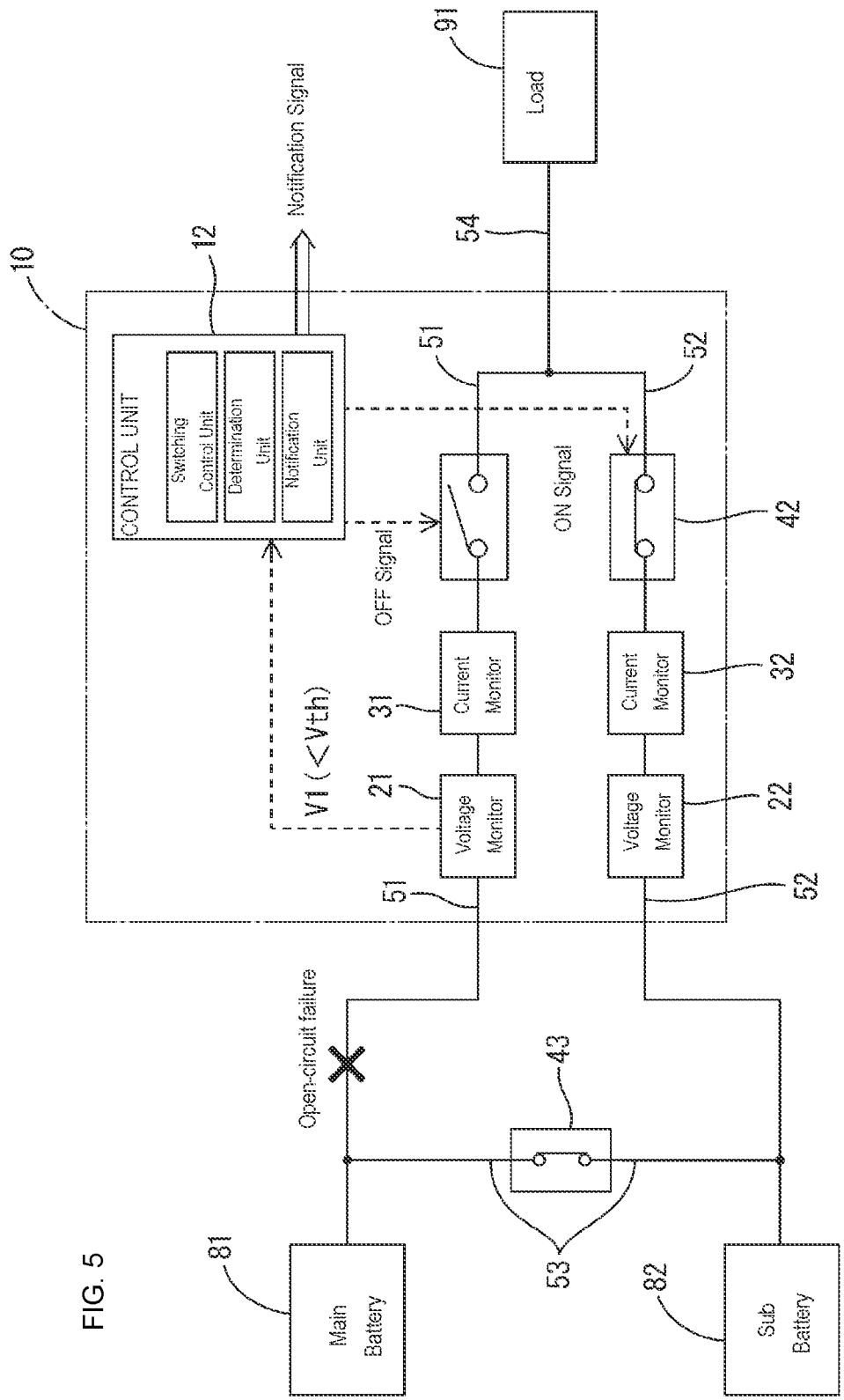
FIG. 5 is an illustrative diagram conceptionally illustrating notification operation if a voltage value on the upstream side is lower than a threshold value when a relay unit in one of the paths is switched to the OFF state in the relay device shown in FIG. 2.

In step S6, if the control unit 12 determines that the voltage value on the upstream side of the relay unit that was switched to the OFF state in step S5 is lower than the voltage threshold value Vth (in case of "YES" in S6), it executes the process of step S7, and gives a notification to the outside (specifically, a notification indicating an open-circuit failure or the like). If it is determined that, for example, a current value I1 of the first conduction path 51 is lower than the current threshold value Ith in step S2 and the first relay unit 41 provided in the first conduction path 51 is switched to the OFF state in the process of the step S5, the control unit 12 outputs a notification signal to the outside as shown in FIG. 5 if it is determined that the voltage value V1 on the upstream side of the first relay unit 41, which is ascertained from the detected value from the first voltage detection unit 21, is lower than the voltage threshold value Vth in the process of step S6. This notification signal may be, for example, a notification signal for displaying a warning mark or message in a lamp or an indicator mounted in the vehicle or may be a notification signal for generating a predetermined warning message or sound from a buzzer or speaker. Or, it may be a notification signal for communicating occurrence of a specific abnormality to an external device (an electronic device in the vehicle or a device outside of a vehicle) using wired or wireless communication or the like. With such a notification signal, the occurrence of the abnormality can be communicated to a user, a person in charge of maintenance, or an external device.

In this configuration, the control unit 12 is one example of the notification unit, and the relay device 10 functions to give a notification if the determination unit has determined that, when one of the relay units is in the OFF state, a voltage value detected by one of the voltage detection units is lower than the predetermined voltage threshold value Vth.

If the control unit 12 determines that, in step S6, the voltage value on the upstream side of the relay unit that was switched to the OFF state in step S5 is not lower than the voltage threshold value Vth (in case of "NO" in S6), it returns to step S1 and executes the processes of step S1 onwards.

In this manner, when one of the relay units provided in a path that was determined that its current value decreases lower than or equal to the current threshold value Ith in step S2, if the control unit 12 determines that the voltage value detected by one of the voltage detection units provided in the path is not lower than the voltage threshold value Vth, it returns the one relay unit to the ON state.

As described above, in the relay device 10 in this configuration, the control unit 12 functions as the switching control unit, and it keeps the first relay unit 41 and the second relay unit 42 in the ON state if both of the current values I1 and I2 of the first conduction path 51 and the second conduction path 52 is larger than or equal to the predetermined current threshold value Ith. With this configuration, if a current larger than or equal to the current threshold value Ith is supplied in each of the first conduction path 51 and the second conduction path 52, it is possible to supply current through the two paths. Accordingly, if an open-circuit failure occurs in one of the first conduction path 51 and the second conduction path 52 and the current decreases or stops in the one path, current supply to the load 91 is appropriately continued if the current in the other path is appropriately maintained.

In addition to enabling current supply through the two paths, if the current value becomes lower than the current threshold value Ith in one of the paths, it is possible to switch one of the first relay unit 41 and the second relay unit 42, which is provided in the one path whose current value becomes lower than the current threshold value Ith, to the OFF state. In this manner, after the one relay unit provided in the one path in which the current decreases or stops was switched to the OFF state, it can be determined whether the voltage value on the upstream side relative to the one relay unit is lower than the predetermined voltage threshold value Vth. By making the determination in such a manner, it is possible to distinguish more accurately whether a cause of a current value becoming lower than the current threshold value Ith in the one path is due to occurrence of an open-circuit failure or the like on the upstream side of the one relay unit.

Figure 13:
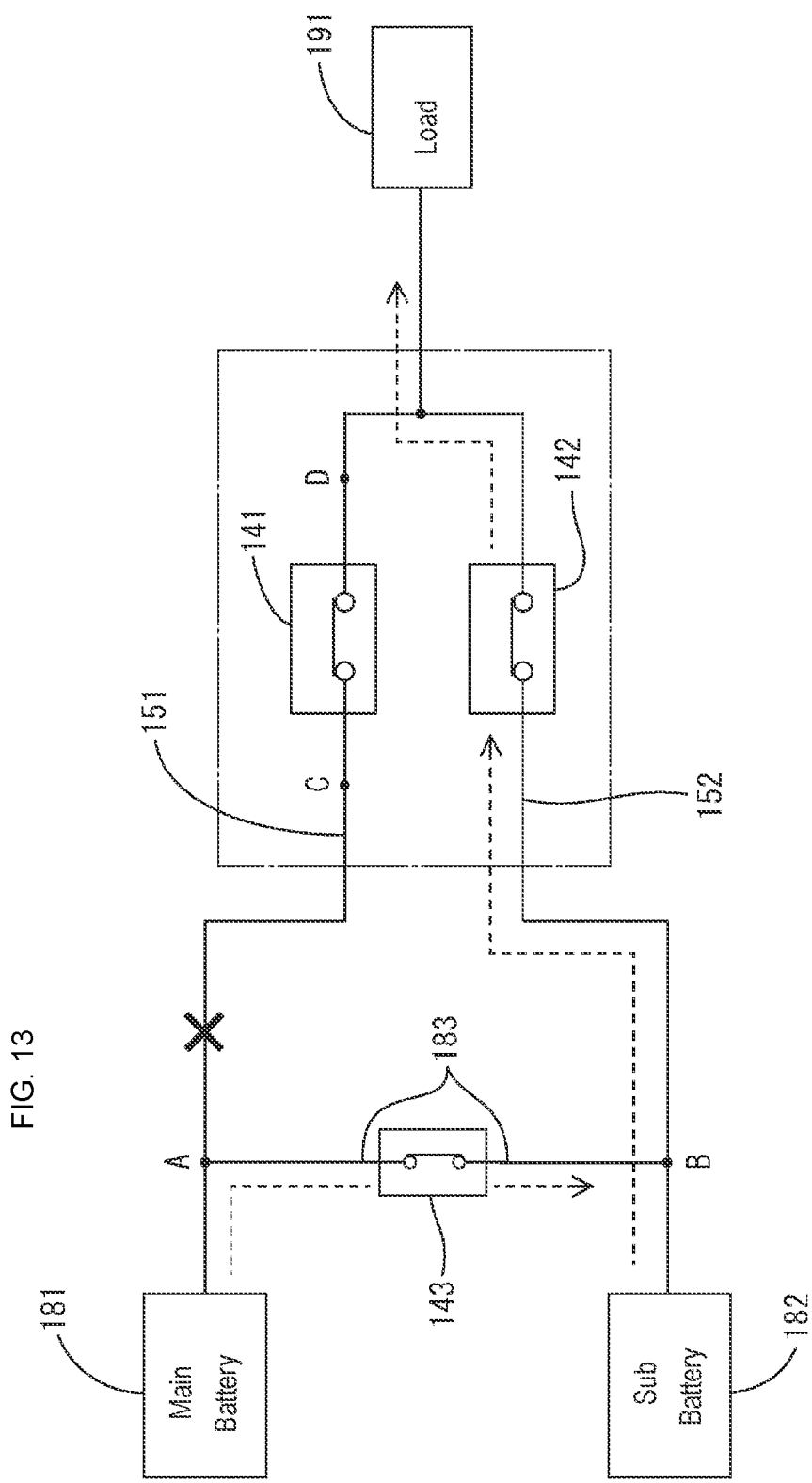
FIG. 13 is a block diagram schematically illustrating an example of a relay device and its surroundings according to a comparative example.

Here, the effect will be described in more detail by giving a comparative example. The in-vehicle power supply system of the comparative example shown in FIG. 13 has, for example, a configuration in which power from a main battery 181 is supplied to a load 191 via a conduction path 151 and power from a sub battery 182 is also supplied to the load 191 via a conduction path 152. Also, the system has a configuration in which the main battery 181 and the sub battery 182 are connected via a conduction path 183 and the charging current can be supplied, when a relay unit 143 is in the ON state, to both of the batteries 181 and 182 via a generator (not shown) that is connected to the main battery 181. Then, in this configuration, it is possible to supply power to the load 191 through two paths by both of the relay units 141 and 142 being switched to the ON state. However, in the system shown in FIG. 13, if an open-circuit failure occurs at position P1, because all positions of A, B, C, and D shown in FIG. 13 have the same potential, it is impossible to detect this malfunction using a simple voltage determination. And if the malfunction is detected only based on the current flowing through each path, then there is the problem that accurate detection is difficult because the current value may become 0 A due to the influence of noise and the like. In contrast, the relay device 10 having this configuration can reliably resolve this problem and can ascertain more accurately a state in which an open-circuit failure occurs and a state in which it does not occur.

Furthermore, if a current value becomes lower than the current threshold value Ith in one of the first conduction path 51 and the second conduction path 52, the control unit 12, which can function as the switching control unit, has a configuration in which it switches one of the first relay unit 41 and the second relay unit 42 (one relay unit), which is provided in the one path (the path whose current value becomes lower than the current threshold value Ith), to the OFF state after confirming that the relay unit (the other relay unit) provided in the other path (the other path that is different from the one path whose current value becomes lower than the current threshold value Ith) is in the ON state. If a current value becomes lower than the current threshold value Ith in one of the paths, the relay device configured in this manner can switch the relay unit provided in the one path (the one relay unit) to the OFF state after securely switching the other relay unit to the ON state. Accordingly, power supply to the load 91 is reliably prevented from being lost before and after the one relay unit is switched to the OFF state.

The relay device 10 includes a notification unit that gives a notification if it is determined that, when the one relay unit provided in the path whose current value becomes lower than the current threshold value Ith is in the OFF state, a voltage value detected by the voltage detection unit in that path (one voltage detection unit) is lower than the predetermined voltage threshold value Vth. If a possibility that an abnormality occurs in one of the paths becomes higher (if the current decreases or stops in one of the paths, when the relay unit in the one path is switched to the OFF state, and if a voltage value on the upstream side of the relay unit becomes lower than the threshold value), the relay device 10 configured in this manner can notify the outside about this. Accordingly, it is easier for a user or a device receiving the notification to take appropriate measures according to the abnormality.

When one of the relay units provided in a path whose current value becomes lower than the current threshold value Ith is in the OFF state and if it is determined that a voltage value detected by the voltage detection unit in the path (one voltage detection unit) is not lower than the predetermined voltage threshold value Vth, the switching control unit 12, which can function as the switching control unit, returns the one relay unit to the ON state. When the current flowing through one of the paths temporarily decreases, for example, by influence of noise and the like and one of the relay units is switched to the OFF state according to this, if a voltage exceeding the predetermined voltage threshold value is generated on the upstream side of the one relay unit (that is, if the possibility that an abnormality such as an open-circuit failure does not occur on the upstream side of the one relay unit is high), the relay device 10 configured in this manner returns the one relay unit to the ON state and can continue power supply through the one path.

The above-described configuration is the basic configuration of the relay device 10, and the following functions can be further added to the relay device 10.

In the switching control in FIG. 6, when the determination process in step S2 is executed, if a current value in one of the first conduction path 51 and the second conduction path 52 becomes lower than the current threshold value Ith, the processes of step S3 onwards may be executed as described above. Note that, in the determination process of step S2, if both of the current values of the first conduction path 51 and the second conduction path 52 become lower than the current threshold value Ith, it is possible to perform the processes of steps S3 to S7 in each path.

Specifically, if the control unit 12 determines that, in the determination of step S2, both current values I1 and I2 of the first conduction path 51 and the second conduction path 52 are lower than the above-described current threshold value Ith, it sets a first switching state in which, the first relay unit 41 is switched to the OFF state and the second relay unit 42 is switched to the ON state. In this example, the first relay unit 41 is "one relay unit", and the second relay unit 42 is "the other relay unit". The control unit 12, which corresponds to the determination unit, determines whether, when in the first switching state as described above, the voltage value V1 detected by the first voltage detection unit 21 (one voltage detection unit) provided in the path in which the first relay unit 41 (the one relay unit) is provided is lower than the above-described voltage threshold value Vth. Then, if the control unit 12 determines that the voltage value V1 that is detected by the first voltage detection unit 21 when the first switching state is set is lower than the voltage threshold value Vth, it gives the same notification of step S7, and performs, for example, notification indicating that an open-circuit failure occurs in the first conduction path 51. On the other hand, if the control unit 12 determines that the voltage value V1 that is detected by the first voltage detection unit 21 when the first switching state is set is not lower than the voltage threshold value Vth, it returns the first relay unit 41 to the ON state.

After controlling to set the first relay unit 41 and the second relay unit 42 to the first switching state, the control unit 12 switches the second relay unit (the other relay unit) to the OFF state and for switching the first relay unit 41 (the one relay unit) to the ON state (control for setting a second switching state). The control unit 12, which corresponds to the determination unit, determines whether, when in the second switching state as described above, a voltage value V2 that is detected by the second voltage detection unit 22 (the other voltage detection unit) provided in the path in which the second relay unit 42 (the other relay unit) is provided is lower than the above-described voltage threshold value Vth. Then, if the control unit 12 determines that the voltage value V2 that is detected by the second voltage detection unit 22 when the second switching state is set is lower than the voltage threshold value Vth, it gives the same notification operation of step S7, and performs, for example, notification indicating that an open-circuit failure occurs in the second conduction path 52. On the other hand, if the control unit 12 determines that the voltage value V2 that is detected by the second voltage detection unit 22 when the second switching state is set is not lower than the voltage threshold value Vth, it returns the second relay unit 42 to the ON state.

If a current value becomes lower than the predetermined current threshold value Ith in both of the first conduction path 51 and the second conduction path 52, the relay device 10 configured in this manner determines the voltage value on the upstream side by switching the relay units one by one, and thus can separately determine whether a voltage drop due to an open-circuit failure or the like occurs on the upstream side of each relay unit. In addition, when performing the determination with one relay unit being in the OFF state, power supply to the load 91 can be continued by the other relay unit being in the ON state, and thus the power supply to the load 91 is not easily interrupted.

Note that, in the above-described example, the first relay unit 41 is set as "one relay unit" and the second relay unit 42 is set as "the other relay unit", but this setting may also be reversed. That is, the second relay unit 42 may also be set as "one relay unit" and the first relay unit 41 may also be set as "the other relay unit".

Furthermore, if reverse flow occurs in one of the first conduction path 51 and the second conduction path 52, the relay device 10 may also perform the following protection operation.

Specifically, in the determination process of the step S2 of the switching control shown in FIG. 6, the control unit 12 can determine also whether, based on both of the detected values by the first current detection unit 31 and the second current detection unit 32, the current flowing through one of the first conduction path 51 and the second conduction path 52 flows in the reverse direction to the normal direction (the opposite direction to the direction toward the load 91). If the current flowing through one of the first conduction path 51 and the second conduction path 52 flows in the reverse direction to the normal direction, the control unit 12 switches the relay unit, which is provided in a reverse flow path in which the reverse flow of the current occurs, to the OFF state, and switches the third relay unit 43 to the OFF state.

The system 100 shown in FIG. 1 is a system that has the generator 84 that is a supply source of the charging current on one power storage unit (first power storage unit 81) side and can supply the charging current from this generator 84 to the other power storage unit (second power storage unit 82) via the third conduction path 53. In such a system 100, if reverse flow of current occurs in one of the first conduction path 51 and the second conduction path 52, the relay device 10 having this configuration can cut off the reverse flow by switching one of the first relay unit 41 and the second relay unit 42, which is provided in the reverse flow path in which reverse flow of current occurs, to the OFF state, and the relay device 10 can switch the third relay unit 43 to the OFF state, and thus the other path can be electrically separated from the short-circuit portion if the reverse current occurs due to a short-circuit or the like occurring in the vicinity of the power storage unit. Accordingly, also if reverse flow occurs due to a short-circuit in the vicinity of the power storage unit, current supply to the load 91 via the other path is likely to be stably continued.

In the determination process of the step S2 of the switching control shown in FIG. 6, for example, if the control unit 12 determines that the current flowing through the first conduction path 51 flows in the reverse direction (opposite direction to the direction toward the load 91), the control unit 12 switches the first relay unit 41 provided in the first conduction path 51 in which the reverse current occurs to the OFF state and switches the third relay unit 43 to the OFF state. To perform such control, for example, if the reverse flow in the first conduction path 51 is caused by a ground fault or the like in the vicinity of the first power storage unit 81, it is possible to electrically separate the portion where the ground fault or the like has occurred from the second conduction path 52, and thus it is possible to stably supply power to the load 91 without being affected by the occurrence of the ground fault or the like on the second conduction path 52 side.

Embodiment 2

Next, Embodiment 2 will be described with reference to FIG. 7 and so on. In Embodiment 1, an example was described in which the entire relay device 10 is configured as an integrated unit device. In contrast, a relay device relay device 210 of Embodiment 2 shown in FIG. 7 differs from the relay device 10 of Embodiment 1 only in that it is configured with a plurality of unit devices, a control unit is provided in each of the unit devices, and a communication line 214 connecting among the unit devices is provided. Accordingly, in the relay device 210 of Embodiment 2, structures that are the same as those of the relay device 10 of Embodiment 1 are given the same reference numerals of each portion of the relay device 10, and their detailed descriptions are omitted.

Figure 7:
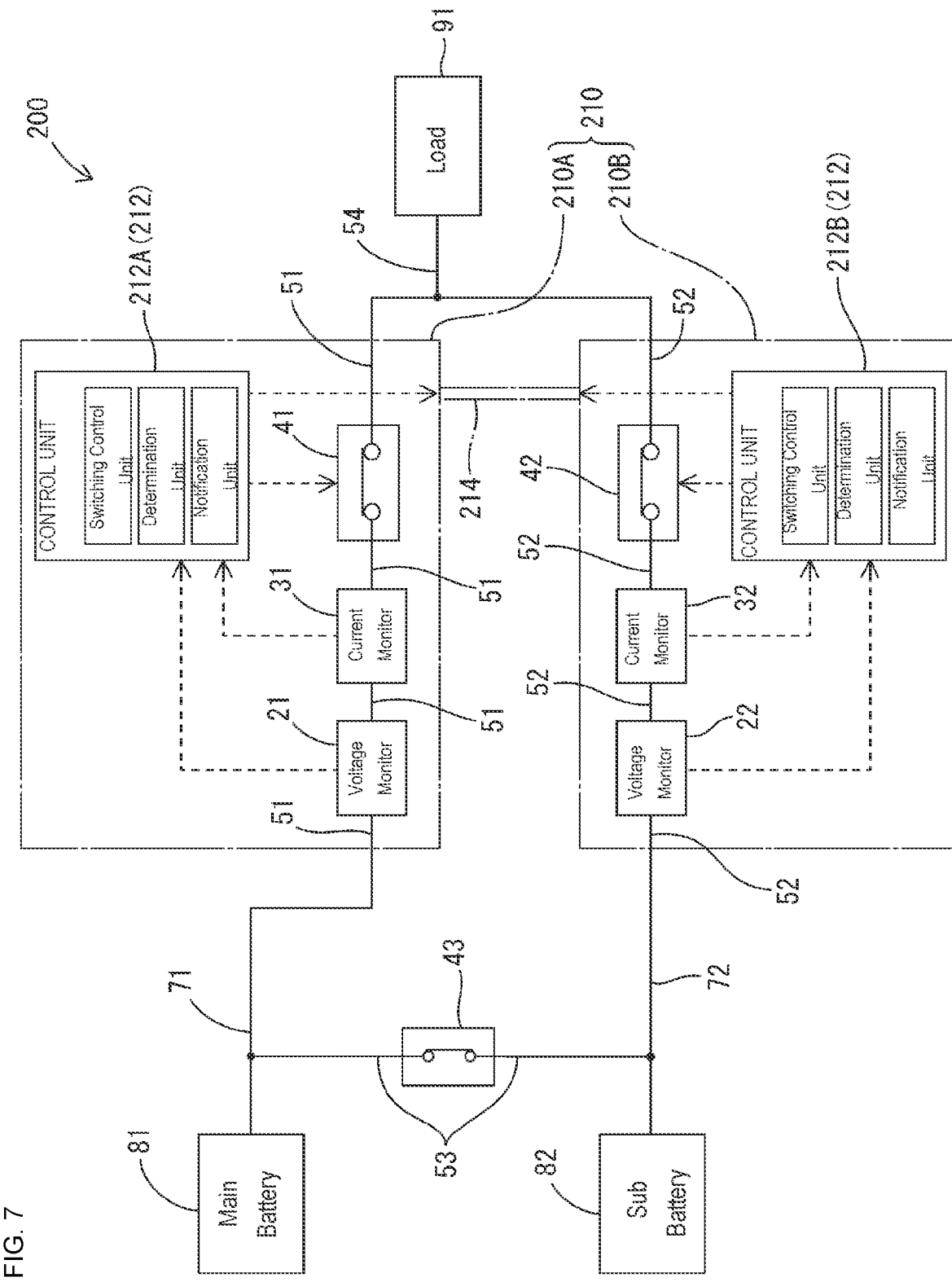
FIG. 7 is a block diagram schematically illustrating an example of a relay device and its surroundings according to Embodiment 2.

In the example shown in FIG. 7, the first relay unit 41, the first voltage detection unit 21, the first current detection unit 31, and a control unit 212A are mounted, for example, on the same board, constituting a unit device 210A in which these elements are integrated as a unit. Also, the second relay unit 42, the second voltage detection unit 22, the second current detection unit 32, and a control unit 212B are mounted, for example, on the same board, constituting a unit device 210B in which these elements are integrated as a unit. The unit devices 210A and 210B constitute the relay device 210. Note that, in an in-vehicle power supply system 200 (hereinafter, also referred to as "system 200") as shown in FIG. 2, the portions other than the relay device 210 have the same configuration as in the in-vehicle power supply system 100 shown in FIGS. 1, 2 and so on. Also, each of the control units 212A and 212B has the same configuration as the control unit 12 (shown in FIG. 2 and so on).

In the example shown in FIG. 7, each of the control units 212A and 212B may perform the same switching control shown in FIG. 6 when the predetermined start condition is established. When each of the control units 212A and 212B performs the switching control shown in FIG. 6, it may switch ON the relay unit of the unit device 210A or 210B, in which it is provided, in step S1. In step S2, the control unit may compare the current value of the conduction path in which that relay unit is provided with the current threshold value Ith and may determine whether the current value is lower than the current threshold value Ith. Then, in step S2, if the control unit determines that the current value in the conduction path in which that relay unit is provided is lower than the current threshold value Ith, the control unit may perform information communication via the communication line 214, and may confirm the ON or OFF state of the other relay unit in step S3 (the other relay unit provided in the other unit device that is not the unit device in which the process of step S3 is being executed). If the other relay unit is in the ON state, the control unit executes the process of step S5, switches the relay unit in the path whose current value is determined to be lower than the current threshold value Ith in step S2 to the OFF state, and may determine whether the voltage value on the upstream side of that relay unit is lower than the voltage threshold value Vth. If the voltage value on the upstream side of that relay unit is lower than the voltage threshold value Vth, the control unit may give a notification in step S7, and if the voltage value on the upstream side of that relay unit is not lower than the voltage threshold value Vth, the control unit may return that relay unit to the ON state.

Here, an example in which the control unit 212A of the unit device 210A performs the same switching control as shown in FIG. 6 is described. When the control unit 212A performs the same switching control as shown in FIG. 6, it switches the first relay unit 41 of the unit device 210A, in which it is provided, to the ON state, and in step S2, compares the current value I1 of the first conduction path 51 in which the first relay unit 41 is provided with the current threshold value Ith, and then determines whether the current value I1 is lower than the current threshold value Ith. In step S2, if the control unit 212A determines that the current value I1 of the first conduction path 51 is lower than the current threshold value Ith, in step S3, it performs information communication via the communication line 214, and confirms the ON or OFF state of the other second relay unit 42. Note that, if the other control unit 212B receives such an inquiry for confirmation via the communication line 214, it may communicate information specifying the ON or OFF state of the second relay unit 42 to the control unit 212A at the time when receiving the inquiry. If in case of "YES" in step S2, the control unit 212A waits until the other second relay unit 42 is switched to the ON state, whereas if the other second relay unit is in the ON state, the control unit 212A executes the process of the step S5, and switches the first relay unit 41 to the OFF state. After that, in step S6, the control unit 212A determines whether the voltage value V1 on the upstream side of the first relay unit 41, which is detected by the first voltage detection unit 21, is lower than the voltage threshold value Vth. If the voltage value V1 on the upstream side of the first relay unit 41 is lower than the voltage threshold value Vth, the control unit 212A may give a notification in step S7, whereas if the voltage value V1 on the upstream side of the first relay unit 41 is not lower than the voltage threshold value Vth, it may return the first relay unit 41 to the ON state. Note that, here, a specific example in which the control unit 212A performs a switching control similar to that in FIG. 6 is described, but such a flow may also be performed if the control unit 212B performs a switching control similar to that in FIG. 6.

Embodiment 3

Figure 8:
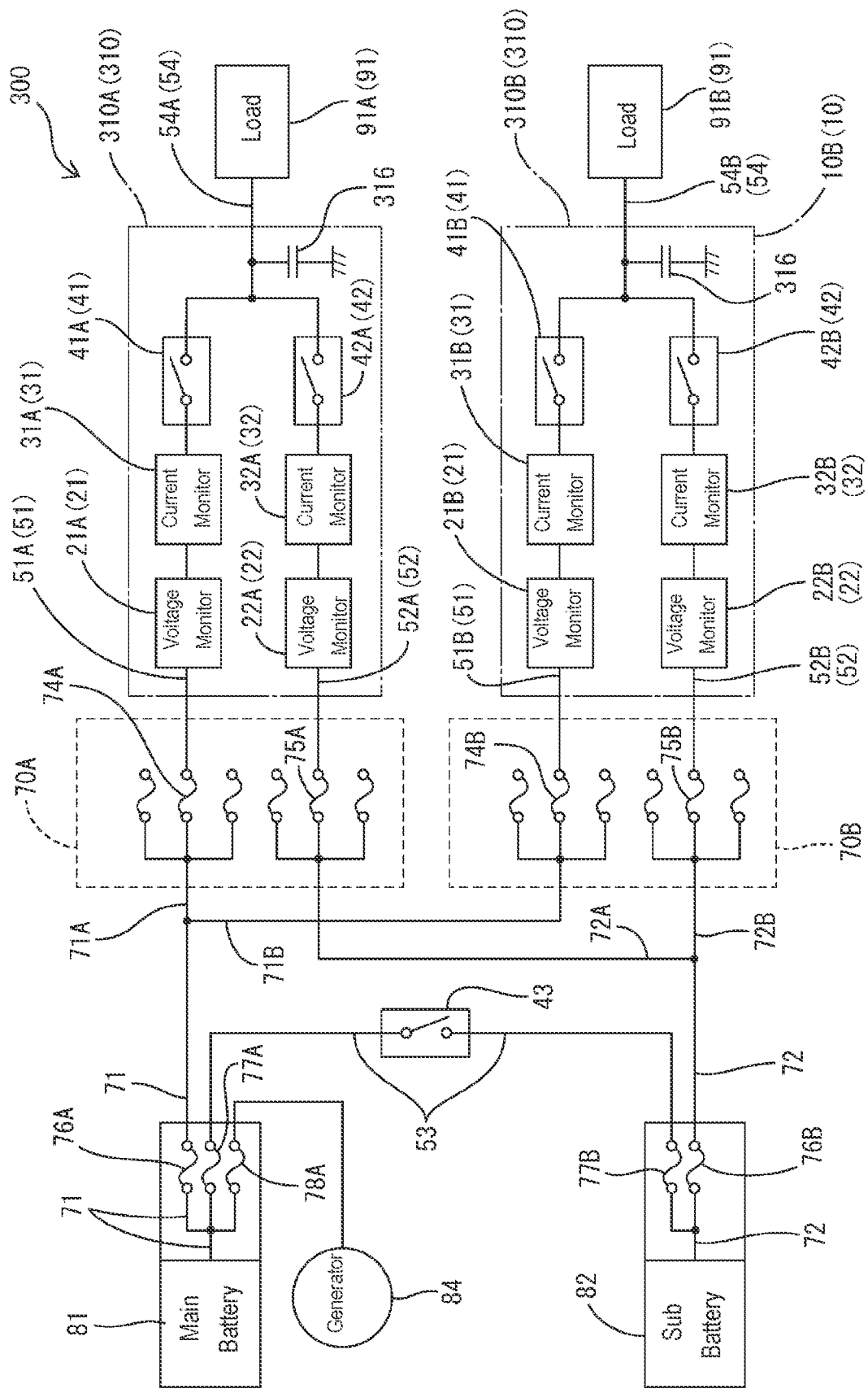
FIG. 8 is a block diagram schematically illustrating an example of an in-vehicle power supply system including a relay device according to Embodiment 3.
Figure 9:
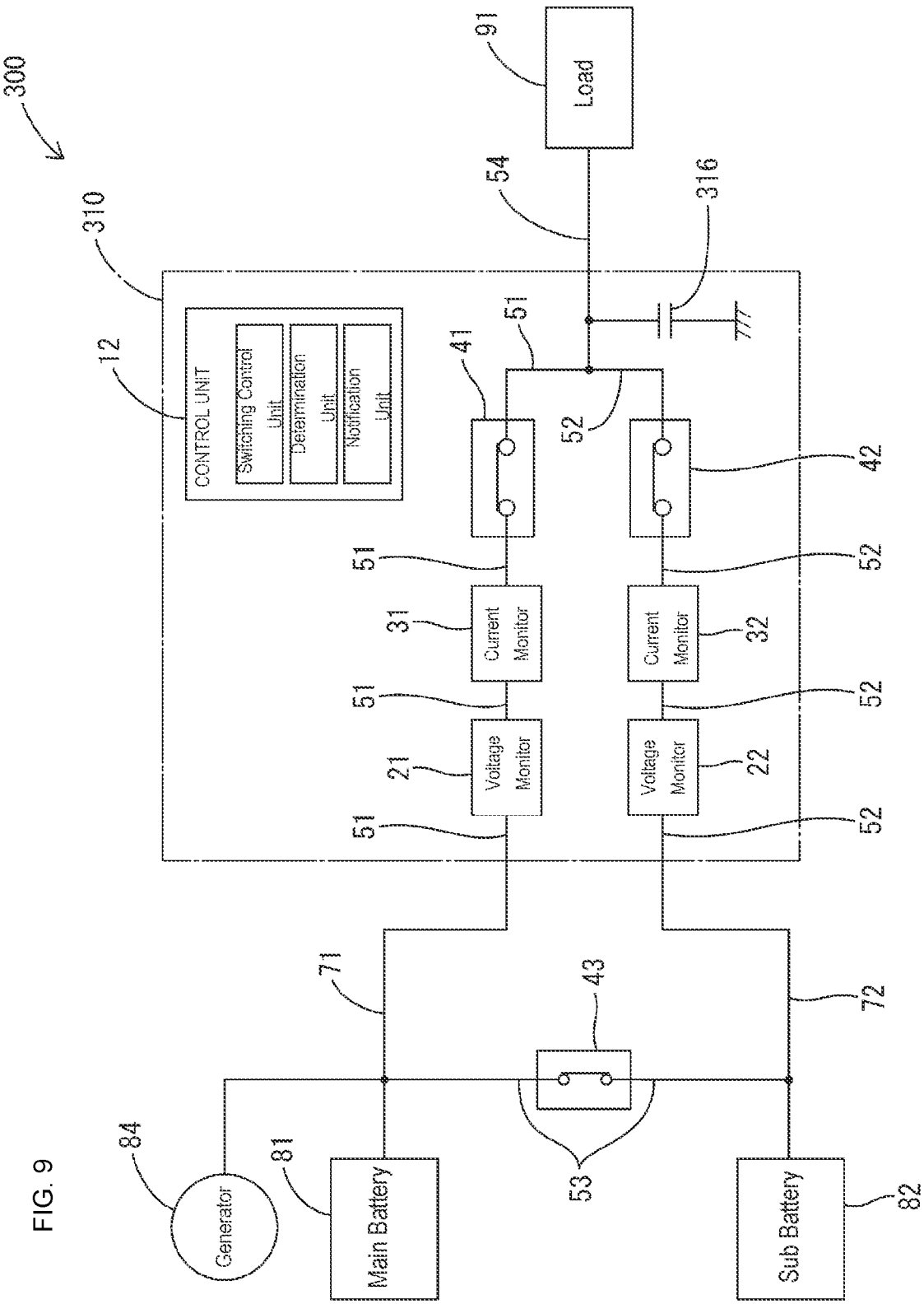
FIG. 9 is a block diagram schematically illustrating an example of the relay device and its surroundings according to Embodiment 3.

Next, Embodiment 3 will be described with reference to FIG. 8 and so on. A relay device 310 of Embodiment 3 has a more specific configuration of the relay device 10 of Embodiment 1, includes all of the structures and functions of the aforementioned relay device 10 of Embodiment 1, and has a configuration in which further structures and functions are added. Accordingly, the same portions of Embodiment 1 in FIGS. 8 and 9 are given the same reference numerals in FIGS. 1 and 2, and the detailed description of them is omitted. Specifically, the in-vehicle power supply system 300 shown in FIG. 8 differs from the in-vehicle power supply system 100 shown in FIG. 1 only in that a third power storage unit 316 is added. The relay device 310 of Embodiment 3 shown in FIG. 9 and so on differs from the relay device 10 of Embodiment 1 shown in FIG. 2 and so on in that the third power storage unit 316 is added, and other portions are the same as those of the relay device 10 of Embodiment 1.

Note that a relay device 310B shown in FIG. 8 has the same configuration and functions as those of the relay device 310A. As a representative example, in the following description, it is assumed that the relay device 310A shown in FIG. 8 has a configuration as shown in FIG. 9.

The relay device 310 shown in FIG. 9 includes the third power storage unit 316. This third power storage unit 316 is configured as a capacitor, and may be electrically connected to at least one of a portion on the load 91 side relative to the first relay unit 41 in the path between the first power storage unit 81 and the load 91 (a portion on a downstream side relative to the first relay unit 41) and a portion on the load 91 side relative to the second relay unit 42 in the path between the second power storage unit 82 and the load 91 (a portion on a downstream side relative to the second relay unit 42). In the example shown in FIG. 9, the third power storage unit 316 is electrically connected to a conduction path 54 that is a shared path connecting both of the first conduction path 51 and the second conduction path 52 and the load 91. Specifically, one electrode of the third power storage unit 316, which is configured as a capacitor, is connected to the conduction path 54, and the other electrode is connected to ground. This third power storage unit 316 has a configuration in which it is charged by at least one of the first power storage unit 81 and the second power storage unit 82 when at least one of the first relay unit 41 and the second relay unit 42 is in the ON state. Then, even when both of the first relay unit 41 and the second relay unit 42 are switched to the OFF state, the third power storage unit 316 is kept being conductively connected with the load 91, and thus it can supply power to the load 91.

The relay device 310 configured in this manner can supply power to the load 91 using the third power storage unit 316 even when both of the relay units are switched to the OFF state for some reason, and thus power supply to the load 91 is even less likely to be cut off. When a path of one relay unit is inspected, for example, by switching the one relay unit to the OFF state, even if the other relay unit is in the OFF state for some reason, power supply to the load 91 is likely to be continued with power that is supplied from the third power storage unit 316.

The relay device 310 shown in FIG. 9 can perform switching control (shown in FIG. 6) in the same manner as that in Embodiment 1, and then the measures for various abnormalities described in Embodiment 1 can be similarly applied to it.

Figure 10:
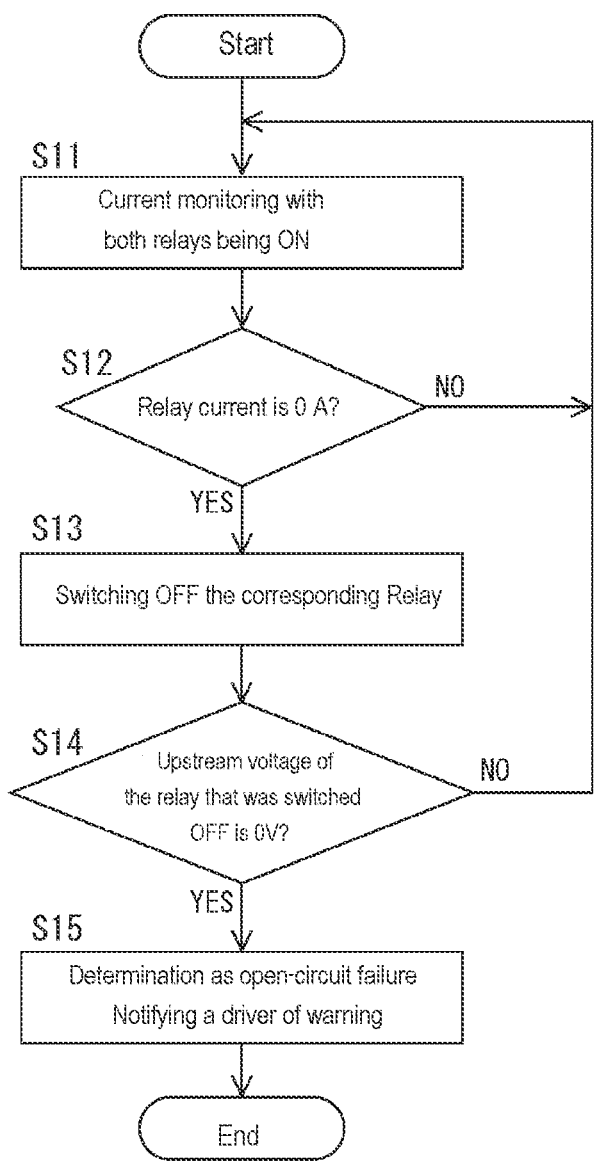
FIG. 10 is a flowchart illustrating an example of a control flow performed by the relay device according to Embodiment 3.

To shorten the processing time period, the relay device 310 shown in FIG. 9 may perform, instead of the switching control shown in FIG. 6, switching control with a flow as shown in FIG. 10 in which the confirmation process of step S3 and the determination process of step S4 in FIG. 6 are omitted. Note that the processes of steps S11, S12, S13, S14, and S15 of the switching control in FIG. 10 are respectively the same as those of steps S1, S2, S5, S6, and S7 in FIG. 6.

Figure 11:
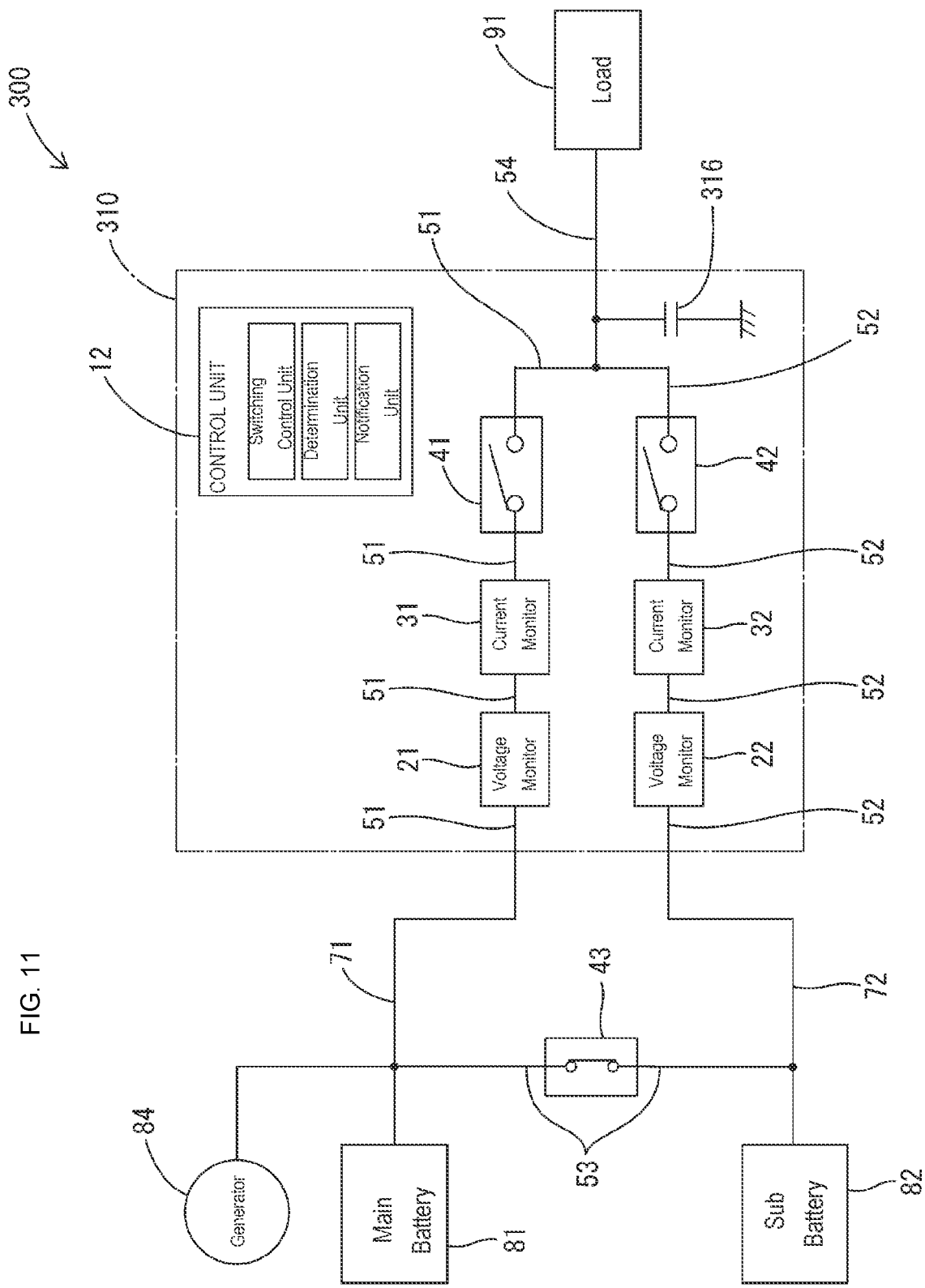
FIG. 11 is an illustrative diagram conceptionally illustrating a case where both relay units are switched to the OFF state in the relay device according to Embodiment 3.

When the switching control is performed with the flow as shown in FIG. 10, because the processes of steps S3 and S4 shown in FIG. 6 are omitted, when one relay unit that is provided in one of the paths is switched to the OFF state in step S13 in accordance with the current value of the one path becoming lower than the current threshold value Ith, there is a possibility that the other relay unit may be switched OFF around the same time. That is, both of the first relay unit 41 and the second relay unit 42 are switched to the OFF state as shown in FIG. 11, and thus there is a possibility that a time period for which no power is supplied to the load 91 from any of the first power storage unit 81, the second power storage unit 82, and the generator 84 occurs. However, even if both of the relay units are switched to the OFF state, power supply from the third power storage unit 316 to the load 91 is continued for a certain time period, and thus the power supply to the load 91 is not easily interrupted.

Embodiment 4

Figure 12:
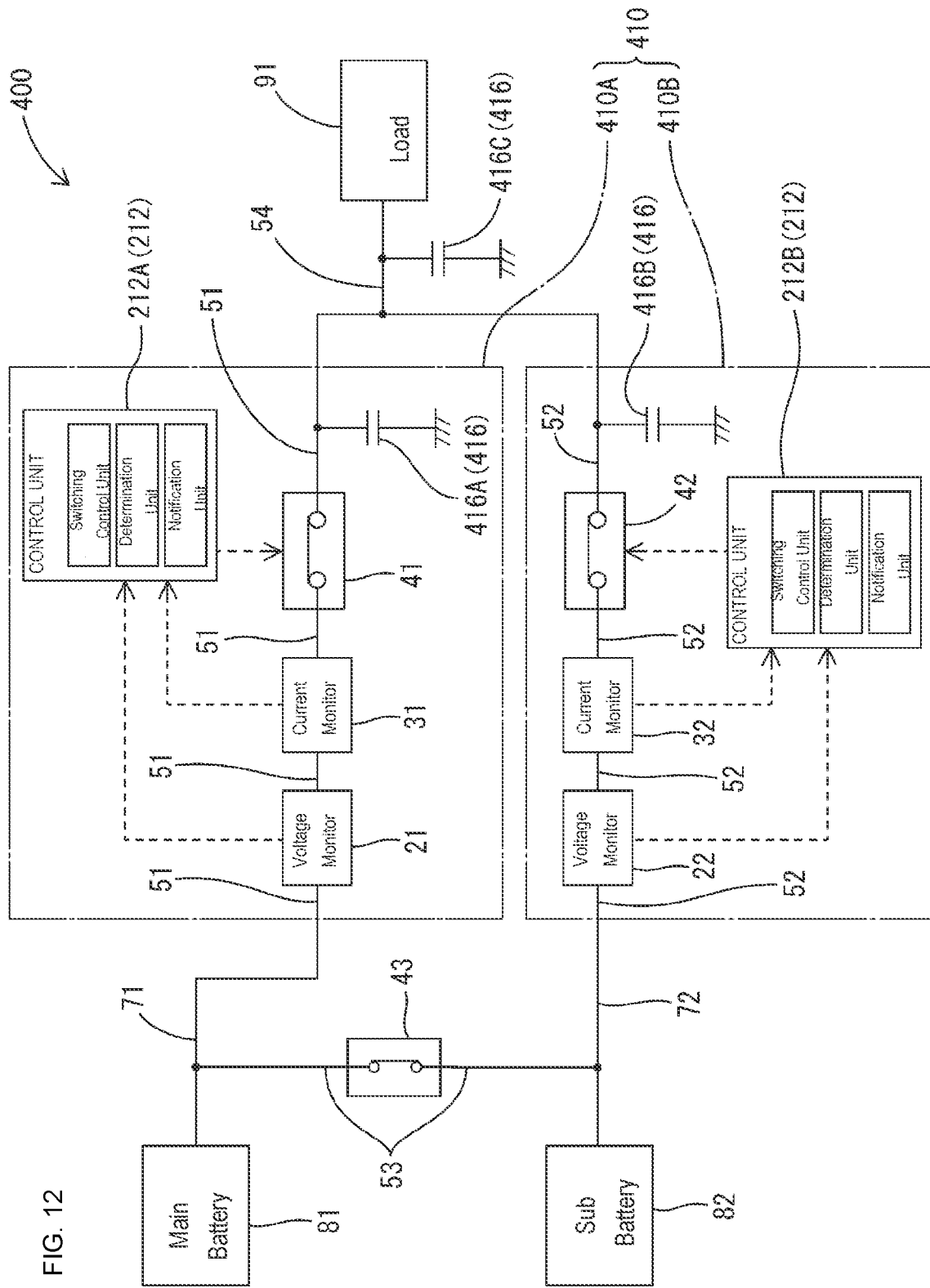
FIG. 12 is a block diagram schematically illustrating an example of a relay device and its surroundings according to Embodiment 4.

Next, Embodiment 4 will be described with reference to FIG. 12. A relay device 410 of Embodiment 4 has a more specific configuration of the relay device 210 of Embodiment 2, includes all of the structures and functions of the aforementioned relay device 210 of Embodiment 2, and has a configuration in which further structures and functions are added. Accordingly, the same portion of Embodiment 2 in FIG. 12 is given the same reference numerals in FIG. 7, and their detailed descriptions are omitted. Specifically, the in-vehicle power supply system 400 shown in FIG. 12 differs from the in-vehicle power supply system 200 shown in FIG. 7 in that a third power storage unit 416 is added. A relay device 410 of Embodiment 4 shown in FIG. 12 differs from the relay device 210 of Embodiment 2 shown in FIG. 7 in that the third power storage unit 416 is added, and other portions are the same as those of the relay device 210 of Embodiment 2. A unit device 410A differs from the unit device 210A shown in FIG. 7 only in that a third power storage unit 416A is added, and a unit device 410B differs from the unit device 210B shown in FIG. 7 only in that a third power storage unit 416B is added.

The relay device 410 shown in FIG. 12 includes three third power storage units 416. These three third power storage units 416 are configured as capacitors, and includes a third power storage unit 416A that is connected to a portion on the load 91 side relative to the first relay unit 41 in the first conduction path 51 (a portion on a downstream side relative to the first relay unit 41), a third power storage unit 416B that is connected to a portion on the load 91 side relative to the second relay unit 42 in the second conduction path 52 (a portion on a downstream side relative to the second relay unit 42), and a third power storage unit 416C that is connected to a conduction path 54, which is a shared path. Each of these third power storage units 416 has a configuration in which it is charged by at least one of the first power storage unit 81 and the second power storage unit 82 when at least one of the first relay unit 41 and the second relay unit 42 is in the ON state. Then, even when one of the first relay unit 31 and the second relay unit 42 is switched to the OFF state, these third power storage units 416 are kept being conductively connected with the load 91, and thus they can supply power to the load 91. The relay device 410 configured in this manner can generate the same effects as those in Embodiments 2 and 3.

The relay device 410 shown in FIG. 12 can perform switching control in the same manner as that in Embodiment 2. When performing the switching control, the relay device 410 may perform the switching control in the same exact manner as that in Embodiment 2, but the process for confirming the ON or OFF state of the relay unit provided in other paths, when the current values of the paths become lower than the current threshold value Ith, may be omitted to shorten the processing time period. In this case, the communication line 214 shown in FIG. 7 can be omitted.

Also in this relay device 410, both of the first relay unit 41 and the second relay unit 42 are switched to the OFF state, and if no power is supplied to the load 91 from any of the first power storage unit 81, the second power storage unit 82, and the generator 84, power supply from the third power storage units 416 to the load 91 is continued, and thus the power supply to the load 91 is not easily interrupted.

Other Embodiments

The present description is not limited to the embodiments described above using the foregoing description and drawings, and embodiments such as the following are also encompassed in the technical scope of the present description.

(1) In the above-described embodiments, examples in which the first and second current detection units are provided on an upstream side relative to the relay units are shown, but these current detection units may also be provided on a downstream side relative to the relay units.

(2) Each of the first relay unit, the second relay unit, and the third relay unit used in the above-described embodiments may be a semiconductor relay device or a mechanical relay device.

(3) In the above-described embodiments, an example in which one load is connected on a downstream side relative to each of the relay devices is shown, but it is also possible to connect a plurality of loads.

LIST OF REFERENCE NUMERALS 10, 210, 310, 410 Relay device
12, 212A, 212B Control unit (switching control unit, determination unit, notification unit)
21 First conduction path
22 Second conduction path
21 Voltage detection unit (first voltage detection unit)
22 Voltage detection unit (second voltage detection unit)
31 Current detection unit (first current detection unit)
32 Current detection unit (second current detection unit)
41 First relay unit
42 Second relay unit
43 Third relay unit
51 First conduction path
52 Second conduction path
53 Third conduction path
81 First power storage unit 82 Second power storage unit
91 Load
316, 416 Third power storage unit

The invention claimed is:
1. A relay device comprising:
a first relay unit provided in a first conduction path that is a path for supplying power from a first power storage unit to a load, the first relay unit being configured to be switched between ON and OFF states;
a second relay unit provided in a second conduction path that is a path for supplying power from a second power storage unit to the load, the second relay unit being configured to be switched between ON and OFF states;
a first current detection unit configured to detect a current value of the first conduction path;
a second current detection unit configured to detect a current value of the second conduction path;
a first voltage detection unit configured to detect a first voltage value at a position on a first power storage unit side relative to the first relay unit in the first conduction path;
a second voltage detection unit configured to detect a second voltage value at a position on a second power storage unit side relative to the second relay unit in the second conduction path;
a switching control unit configured to maintain the ON state of the first relay unit and the second relay unit if both the current values of the first conduction path and the current value of the second conduction path are larger than or equal to a predetermined current threshold value, and configured to switch, if one of the current value of the first conduction path and the current value of the second conduction path becomes lower than the predetermined current threshold value in one of the first conduction path and the second conduction path, one relay unit of the first relay unit and the second relay unit that is provided in the path in which the current value becomes lower than the predetermined current threshold value, to the OFF state; and
a determination unit configured to determine, after the switching control unit switched the one relay unit to the OFF state, if the first voltage value that is detected by the first voltage detection unit or the second voltage value detected by the second voltage detection unit that is provided in the path in which the one relay unit is switched to the OFF state, is lower than a predetermined voltage threshold value.

2. The relay device according to claim 1, wherein the switching control unit is configured to switch, if one of the current value of the first conduction path and the current value of the second conduction path becomes lower than the predetermined current threshold value, the one relay unit of the first relay unit and the second relay unit to the OFF state after confirming that the other relay unit is in the ON state.

3. The relay device according to claim 1, further comprising:
a notification unit configured to give a notification if the determination unit has determined that the first voltage value detected by the first voltage detection unit or the second voltage value detected by the second detection unit when the one relay unit is in the OFF state, is lower than the predetermined voltage threshold value.

4. The relay device according to claim 1, wherein the switching control unit is configured to return the one relay unit to the ON state if the determination unit has determined that a voltage value, which is detected by the one voltage detection unit when the one relay unit is in the OFF state, is not lower than the predetermined voltage threshold value.

5. The relay device according to claim 1, wherein, if the current value becomes lower than the predetermined current threshold value in both of the first conduction path and the second conduction path, the switching control unit is configured to set a state, as a first switching state, in which one of the first relay unit and the second relay unit is switched to the OFF state and the other relay unit is switched to the ON state, and after setting the first switching state, the switching control unit is configured to set a state, as a second switching state, in which the other relay unit is switched to the OFF state and the one relay unit is switched to the ON state; and
the determination unit is configured to determine whether, when in the first switching state, first voltage value detected by the first voltage detection unit or the second voltage value detected by the second voltage detection unit, which is provided in the path in which the one relay unit is provided, is lower than the predetermined voltage threshold value, and configured to determine whether, when in the second switching state, a voltage value detected by the other voltage detection unit of the first voltage detection unit and the second voltage detection unit, which is provided in the path in which the other relay unit is provided, is lower than the predetermined voltage threshold value.

6. The relay device according to claim 1, wherein the switching control unit is configured to control a third relay unit to be in the ON or OFF state, the third relay unit being configured to switch, between conductive and non-conductive states, a third conduction path whose one end is connected to a conduction path between the first power storage unit and the first relay unit and whose other end is connected to a conduction path between the second power storage unit and the second relay unit, and the switching control unit is configured to switch, if reverse flow of current occurs in one of the first conduction path and the second conduction path, the one relay unit of the first relay unit and the second relay unit that is provided in a reverse flow path in which reverse flow of current occurs, to the OFF state and configured to set the third relay unit to the OFF state.

7. The relay device according to claim 1, further comprising:
a third power storage unit that is electrically connected to at least one of a portion on a load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

8. A relay device comprising:
a first relay unit provided in a first conduction path that is a path for supplying power from a first power storage unit to a load, the first relay unit being configured to be switched between ON and OFF states;
a second relay unit provided in a second conduction path that is a path for supplying power from a second power storage unit to the load, the second relay unit being configured to be switched between ON and OFF states;
a first current detection unit configured to detect a current value of the first conduction path;
a second current detection unit configured to detect a current value of the second conduction path;

a first voltage detection unit configured to detect a first voltage value at a position on a first power storage unit side relative to the first relay unit in the first conduction path;

a second voltage detection unit configured to detect a second voltage value at a position on a second power storage unit side relative to the second relay unit in the second conduction path;

a switching control unit configured to maintain the ON state of the first relay unit and the second relay unit if both the current values of the first conduction path and the current value of the second conduction path are larger than or equal to a predetermined current threshold value, and configured to switch, if one of the current value of the first conduction path and the current value of the second conduction path becomes lower than the predetermined current threshold value in one of the first conduction path and the second conduction path, one relay unit of the first relay unit and the second relay unit that is provided in the path in which the current value becomes lower than the predetermined current threshold value, to the OFF state; and a determination unit configured to determine whether, if the switching control unit switched the one relay unit to the OFF state, if the first voltage value that is detected by the first voltage detection unit or the second voltage value detected by the second voltage detection unit that is provided in the path in which the one relay unit is switched to the OFF state, is lower than a predetermined voltage threshold value; and wherein, if the current value becomes lower than the predetermined current threshold value in both of the first conduction path and the second conduction path, the switching control unit is configured to set a state, as a first switching state, in which one of the first relay unit and the second relay unit is switched to the OFF state and the other relay unit is switched to the ON state, and after setting the first switching state, the switching control unit is configured to set a state, as a second switching state, in which the other relay unit is switched to the OFF state and the one relay unit is switched to the ON state; and the determination unit is further configured to determine whether, when in the first switching state, the first voltage value detected by the first voltage detection unit or the second voltage value detected by the second voltage detection unit, which is provided in the path in which the one relay unit is provided, is lower than the predetermined voltage threshold value, and configured to determine whether, when in the second switching state, a voltage value detected by the other voltage detection unit of the first voltage detection unit and the second voltage detection unit, which is provided in the path in which the other relay unit is provided, is lower than the predetermined voltage threshold value.

9. The relay device according to claim 8, wherein the switching control unit is configured to switch, if one of the current value of the first conduction path and the current value of the second conduction path becomes lower than the predetermined current threshold value, the one relay unit of the first relay unit and the second relay unit to the OFF state after confirming that the other relay unit is in the ON state.

10. The relay device according to claim 8, further comprising:

a notification unit configured to give a notification if the determination unit has determined that the first voltage value detected by the first voltage detection unit or the second voltage value detected by the second detection unit when the one relay unit is in the OFF state, is lower than the predetermined voltage threshold value.

11. The relay device according to claim 8, wherein the switching control unit is configured to return the one relay unit to the ON state if the determination unit has determined that a voltage value, which is detected by the one voltage detection unit when the one relay unit is in the OFF state, is not lower than the predetermined voltage threshold value.

12. The relay device according to claim 8, further comprising:

a third power storage unit that is electrically connected to at least one of a portion on a load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

13. A relay device comprising:

a first relay unit provided in a first conduction path that is a path for supplying power from a first power storage unit to a load, the first relay unit being configured to be switched between ON and OFF states;

a second relay unit provided in a second conduction path that is a path for supplying power from a second power storage unit to the load, the second relay unit being configured to be switched between ON and OFF states;

a first current detection unit configured to detect a current value of the first conduction path;

a second current detection unit configured to detect a current value of the second conduction path;

a first voltage detection unit configured to detect a first voltage value at a position on a first power storage unit side relative to the first relay unit in the first conduction path;

a second voltage detection unit configured to detect a second voltage value at a position on a second power storage unit side relative to the second relay unit in the second conduction path;

a switching control unit configured to maintain the ON state of the first relay unit and the second relay unit if both the current values of the first conduction path and the current value of the second conduction path are larger than or equal to a predetermined current threshold value, and configured to switch, if one of the current value of the first conduction path and the current value of the second conduction path becomes lower than the predetermined current threshold value in one of the first conduction path and the second conduction path, one relay unit of the first relay unit and the second relay unit that is provided in the path in which the current value becomes lower than the predetermined current threshold value, to the OFF state; and a determination unit configured to determine whether, if the switching control unit switched the one relay unit to the OFF state, if the first voltage value that is detected by the first voltage detection unit or the second voltage value detected by the second voltage detection unit that is provided in the path in which the one relay unit is switched to the OFF state, is lower than a predetermined voltage threshold value; and wherein the switching control unit is configured to control a third relay unit to be in the ON or OFF state, the third relay unit being configured to switch, between conductive and non-conductive states, a third conduction path whose one end is connected to a conduction path between the first power storage unit and the first relay unit and whose other end is connected to a conduction path between the second power storage unit and the second relay unit, and the switching control unit is configured to switch, if reverse flow of current occurs in one of the first conduction path and the second conduction path, the one relay unit of the first relay unit and the second relay unit that is provided in a reverse flow path in which reverse flow of current occurs, to the OFF state and configured to set the third relay unit to the OFF state.

14. The relay device according to claim 13, wherein the switching control unit is configured to switch, if one of the current value of the first conduction path and the current value of the second conduction path becomes lower than the predetermined current threshold value, the one relay unit of the first relay unit and the second relay unit to the OFF state after confirming that the other relay unit is in the ON state.

15. The relay device according to claim 13, further comprising:
a notification unit configured to give a notification if the determination unit has determined that the first voltage value detected by the first voltage detection unit or the second voltage value detected by the second detection unit when the one relay unit is in the OFF state, is lower than the predetermined voltage threshold value.

16. The relay device according to claim 13, wherein the switching control unit is configured to return the one relay unit to the ON state if the determination unit has determined that a voltage value, which is detected by the one voltage detection unit when the one relay unit is in the OFF state, is not lower than the predetermined voltage threshold value.

17. The relay device according to claim 13, further comprising:
a third power storage unit that is electrically connected to at least one of a portion on a load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

* * * * *